United States Patent
Bennett et al.

(10) Patent No.: US 7,315,916 B2
(45) Date of Patent: Jan. 1, 2008

(54) SCRATCH PAD BLOCK

(75) Inventors: Alan David Bennett, Edinburgh (GB); Sergey Anatolievich Gorobets, Edinburgh (GB)

(73) Assignee: SanDisk Corporation, Milpitas, CA (US)

( * ) Notice: Subject to any disclaimer, the term of this patent is extended or adjusted under 35 U.S.C. 154(b) by 366 days.

(21) Appl. No.: 11/016,285

(22) Filed: Dec. 16, 2004

(65) Prior Publication Data

US 2006/0161722 A1    Jul. 20, 2006

(51) Int. Cl.
*G06F 12/00* (2006.01)
(52) U.S. Cl. ........................ 711/103; 711/159
(58) Field of Classification Search ............... None
See application file for complete search history.

(56) References Cited

U.S. PATENT DOCUMENTS

| | | | |
|---|---|---|---|
| 4,139,911 A | 2/1979 | Sciulli et al. |
| 4,218,764 A | 8/1980 | Furuta et al. |
| 4,253,059 A | 2/1981 | Bell et al. |
| 4,460,982 A | 7/1984 | Gee et al. |
| 4,612,630 A | 9/1986 | Rosier |
| 4,694,454 A | 9/1987 | Matsuura |
| 4,703,196 A | 10/1987 | Arakawa |
| 4,703,453 A | 10/1987 | Shinoda et al. |
| 4,733,394 A | 3/1988 | Giebel |
| 4,763,305 A | 8/1988 | Kuo |
| 4,779,272 A | 10/1988 | Kohda et al. |
| 4,799,195 A | 1/1989 | Iwahashi et al. |
| 4,809,231 A | 2/1989 | Shannon et al. |
| 4,827,450 A | 5/1989 | Kowalski |
| 4,937,787 A | 6/1990 | Kobatake |
| 4,962,322 A | 10/1990 | Chapman |
| 4,964,079 A | 10/1990 | Devin |
| 5,043,940 A | 8/1991 | Harari |
| 5,065,364 A | 11/1991 | Atwood et al. |
| 5,070,032 A | 12/1991 | Yuan et al. |
| 5,095,344 A | 3/1992 | Harari |
| 5,119,330 A | 6/1992 | Tanagawa |
| 5,122,985 A | 6/1992 | Santin |

(Continued)

FOREIGN PATENT DOCUMENTS

EP    0791933 B1    8/1997

(Continued)

OTHER PUBLICATIONS

Lee et al., "Error Correction Technique for Multivalued MOS Memory," *Electronic Letters*, vol. 27, No. 15 (Jul. 18, 1991) pp. 1321-1323.

(Continued)

*Primary Examiner*—Reginald Bragdon
*Assistant Examiner*—Ngoc Dinh
(74) *Attorney, Agent, or Firm*—Winston & Strawn LLP

(57) ABSTRACT

In a memory array having a minimum unit of erase of a block, a scratch pad block is used to store data that is later written to another block. The data may be written to the scratch pad block with a low degree of parallelism and later written to another location with a high degree of parallelism so that it is stored with high density. Data may be temporarily stored in the scratch pad block until it can be more efficiently stored elsewhere. This may be when some other data is received. Unrelated data may be stored in the same page of a scratch pad block.

22 Claims, 18 Drawing Sheets

U.S. PATENT DOCUMENTS

| | | | |
|---|---|---|---|
| 5,132,935 | A | 7/1992 | Ashmore, Jr. |
| 5,151,906 | A | 9/1992 | Sawada |
| 5,157,629 | A | 10/1992 | Sato et al. |
| 5,172,338 | A | 12/1992 | Mehrotra et al. |
| 5,200,922 | A | 4/1993 | Rao |
| 5,200,959 | A | 4/1993 | Gross et al. |
| 5,239,505 | A | 8/1993 | Fazio et al. |
| 5,262,984 | A | 11/1993 | Noguchi et al. |
| 5,263,032 | A | 11/1993 | Porter et al. |
| 5,270,551 | A | 12/1993 | Kamimura et al. |
| 5,270,979 | A | 12/1993 | Harari et al. |
| 5,278,794 | A | 1/1994 | Tanaka et al. |
| 5,313,421 | A | 5/1994 | Guterman et al. |
| 5,313,427 | A | 5/1994 | Schreck et al. |
| 5,315,421 | A | 5/1994 | Kurai et al. |
| 5,321,655 | A | 6/1994 | Iwahashi et al. |
| 5,327,383 | A | 7/1994 | Merchant et al. |
| 5,335,198 | A | 8/1994 | Van Buskirk et al. |
| 5,341,334 | A | 8/1994 | Maruyama |
| 5,343,063 | A | 8/1994 | Yuan et al. |
| 5,347,489 | A | 9/1994 | Merchant et al. |
| 5,365,486 | A | 11/1994 | Schrek |
| 5,377,147 | A | 12/1994 | Merchant et al. |
| 5,394,359 | A | 2/1995 | Kowalski |
| 5,404,485 | A | 4/1995 | Ban |
| 5,465,236 | A | 11/1995 | Naruke |
| 5,475,693 | A | 12/1995 | Christopherson et al. |
| 5,504,760 | A | 4/1996 | Harari et al. |
| 5,523,972 | A | 6/1996 | Rashid et al. |
| 5,532,962 | A | 7/1996 | Auclair et al. |
| 5,570,315 | A | 10/1996 | Tanaka et al. |
| 5,583,812 | A | 12/1996 | Harari |
| 5,598,370 | A | 1/1997 | Niijima et al. |
| 5,648,934 | A | 7/1997 | O'Toole |
| 5,652,720 | A | 7/1997 | Aulas et al. |
| 5,657,332 | A | 8/1997 | Auclair et al. |
| 5,661,053 | A | 8/1997 | Yuan |
| 5,675,537 | A | 10/1997 | Bill et al. |
| 5,689,465 | A | 11/1997 | Sukegawa et al. |
| 5,696,929 | A | 12/1997 | Hasbun et al. |
| 5,699,297 | A | 12/1997 | Yamazaki et al. |
| 5,703,506 | A | 12/1997 | Shook et al. |
| 5,712,815 | A | 1/1998 | Bill et al. |
| 5,717,632 | A | 2/1998 | Richart et al. |
| 5,751,639 | A | 5/1998 | Ohsawa |
| 5,761,125 | A | 6/1998 | Himeno |
| 5,774,397 | A | 6/1998 | Endoh et al. |
| 5,798,968 | A | 8/1998 | Lee et al. |
| 5,835,413 | A | 11/1998 | Hurter et al. |
| 5,835,927 | A | 11/1998 | Fandrich et al. |
| 5,860,091 | A | 1/1999 | DeKoning et al. ........... 711/114 |
| 5,890,192 | A | 3/1999 | Lee et al. |
| 5,905,673 | A | 5/1999 | Khan |
| 5,909,449 | A | 6/1999 | So et al. |
| 5,930,167 | A | 7/1999 | Lee et al. |
| 5,933,368 | A | 8/1999 | Ma et al. |
| 5,937,425 | A | 8/1999 | Ban |
| 5,963,473 | A | 10/1999 | Norman |
| 6,046,935 | A | 4/2000 | Takeuchi et al. |
| 6,049,899 | A | 4/2000 | Auclair et al. |
| 6,125,435 | A | 9/2000 | Estakhri et al. |
| 6,145,051 | A | 11/2000 | Estakhri et al. |
| 6,151,246 | A | 11/2000 | So et al. |
| 6,189,081 | B1 | 2/2001 | Fujio |
| 6,199,139 | B1 | 3/2001 | Katayama et al. |
| 6,222,762 | B1 | 4/2001 | Guterman et al. |
| 6,262,918 | B1 | 7/2001 | Estakhri et al. |
| 6,307,776 | B1 | 10/2001 | So et al. |
| 6,345,001 | B1 | 2/2002 | Mokhlesi |
| 6,415,352 | B1 | 7/2002 | Asami et al. |
| 6,426,893 | B1 | 7/2002 | Conley et al. |
| 6,434,658 | B1 | 8/2002 | Fukuzumi |
| 6,456,528 | B1 | 9/2002 | Chen |
| 6,459,644 | B2 | 10/2002 | Mizushima et al. |
| 6,522,580 | B2 | 2/2003 | Chen et al. |
| 6,560,152 | B1 | 5/2003 | Cernea |
| 6,567,307 | B1* | 5/2003 | Estakhri ................ 365/185.11 |
| 6,678,785 | B2 | 1/2004 | Lasser |
| 6,725,321 | B1 | 4/2004 | Sinclair et al. |
| 6,725,322 | B1 | 4/2004 | Shiraishi et al. |
| 6,760,255 | B2 | 7/2004 | Conley et al. |
| 6,763,424 | B2 | 7/2004 | Conley |
| 6,772,274 | B1 | 8/2004 | Estakhri |
| 6,829,167 | B2 | 12/2004 | Tu et al. |
| 6,898,662 | B2 | 5/2005 | Gorobets |
| 6,925,007 | B2 | 8/2005 | Harari et al. |
| 6,928,511 | B2 | 8/2005 | Chiu |
| 7,023,736 | B2 | 4/2006 | Cernea et al. |
| 2002/0099904 | A1 | 7/2002 | Conley ...................... 711/103 |
| 2003/0065899 | A1 | 4/2003 | Gorobets et al. |
| 2003/0109093 | A1 | 6/2003 | Harari |
| 2003/0206449 | A1 | 11/2003 | Harari et al. |
| 2003/0206460 | A1 | 11/2003 | Katayama et al. .......... 365/200 |
| 2004/0083335 | A1 | 4/2004 | Gonzalez et al. |
| 2004/0156251 | A1 | 8/2004 | Shiota et al. ............... 365/200 |
| 2005/0144357 | A1 | 6/2005 | Sinclair |
| 2005/0144358 | A1 | 6/2005 | Conley et al. |
| 2005/0144360 | A1 | 6/2005 | Bennett et al. |
| 2005/0144363 | A1 | 6/2005 | Sinclair |
| 2005/0144365 | A1 | 6/2005 | Gorobets et al. |
| 2005/0235098 | A1* | 10/2005 | Tamura et al. .............. 711/104 |
| 2006/0133141 | A1 | 6/2006 | Gorobets |
| 2006/0136655 | A1 | 6/2006 | Gorobets et al. |
| 2007/0005829 | A1* | 1/2007 | Fujimoto ..................... 710/48 |

FOREIGN PATENT DOCUMENTS

| | | |
|---|---|---|
| GB | 2289779 A | 11/1995 |
| JP | 8-147988 | 6/1996 |
| JP | 8-279295 | 10/1996 |
| JP | 2000-187992 | 7/2000 |
| WO | WO90/12400 | 10/1990 |
| WO | WO 00/50997 A1 | 8/2000 |
| WO | WO02/058074 | 7/2002 |

OTHER PUBLICATIONS

Notification of Transmittal of the International Search Report and the Written Opinion of the International Searching Authority, or the Declaration, for corresponding Patent Application No. PCT/US2005/044720, mailed Oct. 10, 2006, 10 pages.

Notification of Transmittal of the International Search Report and the Written Opinion of the International Searching Authority, or the Declaration, for corresponding Patent Application No. PCT/US2005/044001, mailed May 17, 2006, 9 pages.

Notification of Transmittal of the International Search Report and the Written Opinion of the International Searching Authority, or the Declaration, for corresponding Patent Application No. PCT/US2005/043811, mailed May 19, 2006, 10 pages.

International Search Report and Written Opinion for related International Application No. PCT/US2005/044649, mailed May 4, 2006, 10 pages.

Unpublished U.S. Appl. No. 10/750,155, filed Dec. 30, 2003.

Unpublished U.S. Appl. No. 10/841,118, filed May 7, 2004.

Unpublished U.S. Appl. No. 10/749,831, filed Dec. 30, 2003.

Imamiya et al., "A 125-mm$^2$ 1-Gb NAND Flash Memory With 10-Mbyte/s Program Speed," IEEE Journal of Solid State Circuits, vol. 37, No. 11, Nov. 2002.

Chang et al., "An Adaptive Striping Architecture for Flash Memory Storage Systems of Embedded Systems", Proceeding of the Eighth IEEE Real-Time and Embedded Technology and Applications Symposium, Sep. 2002, IEEE, pp. 187-196.

* cited by examiner

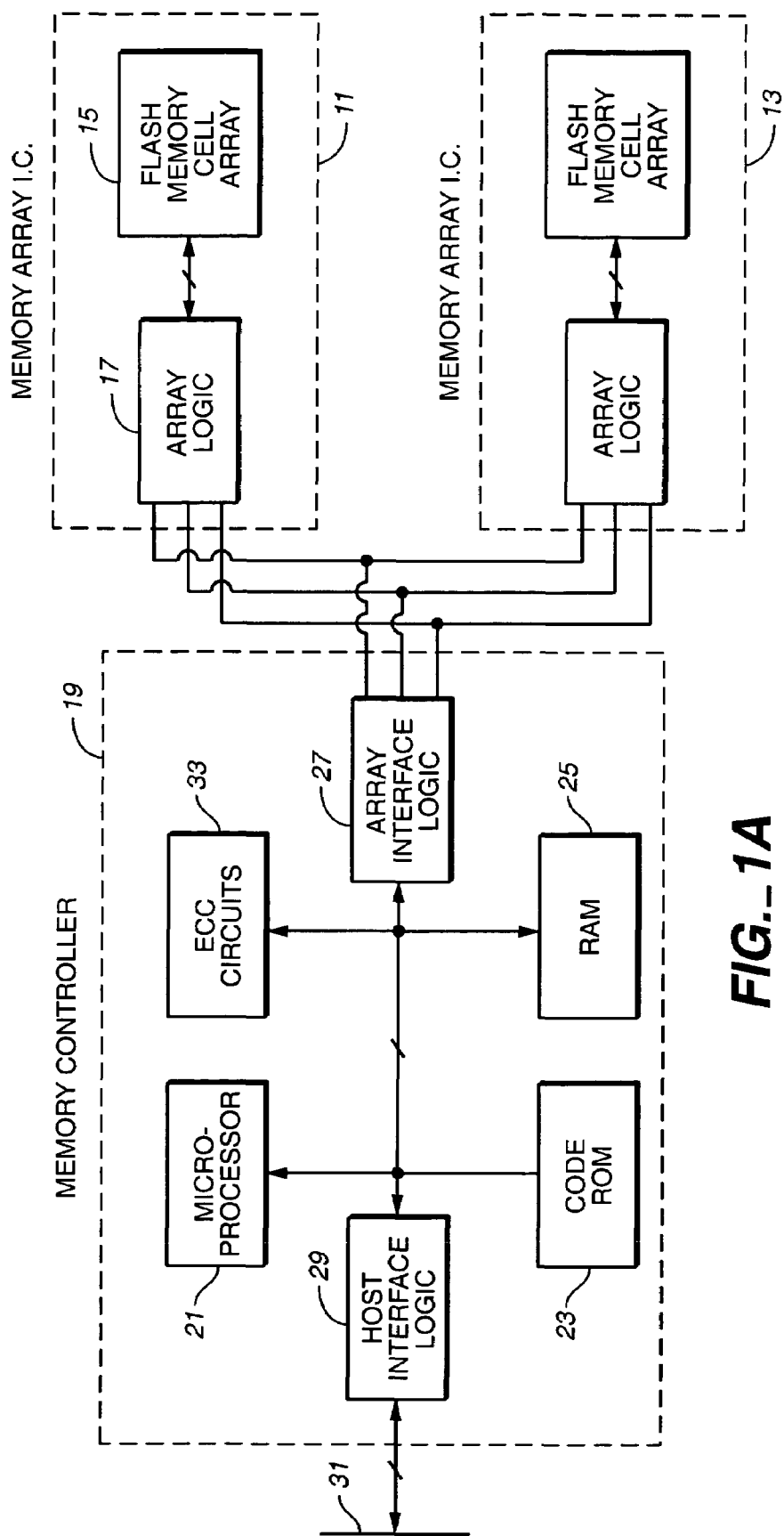
FIG._1A

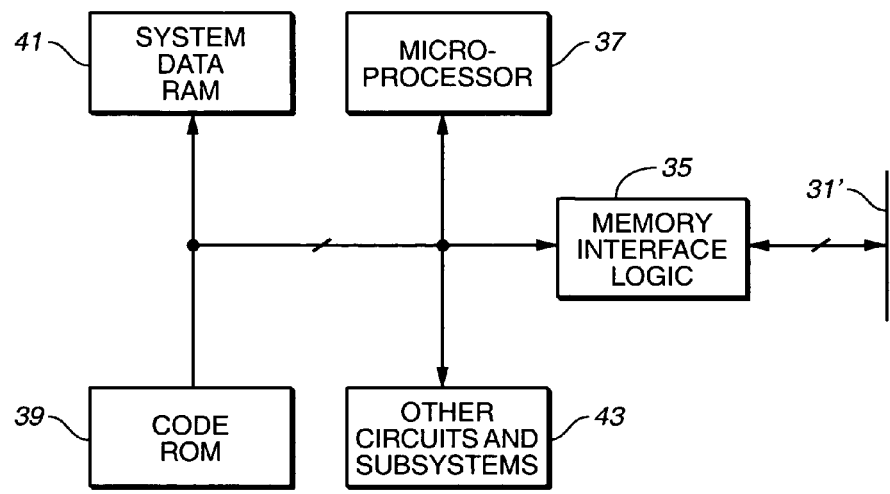
FIG._1B
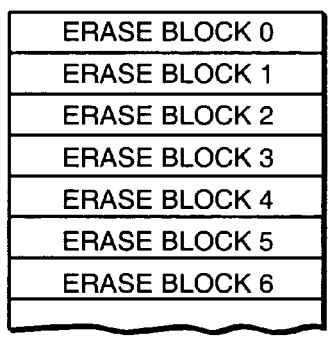
FIG._2
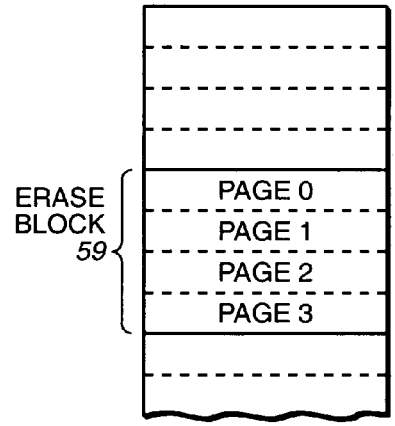
FIG._4
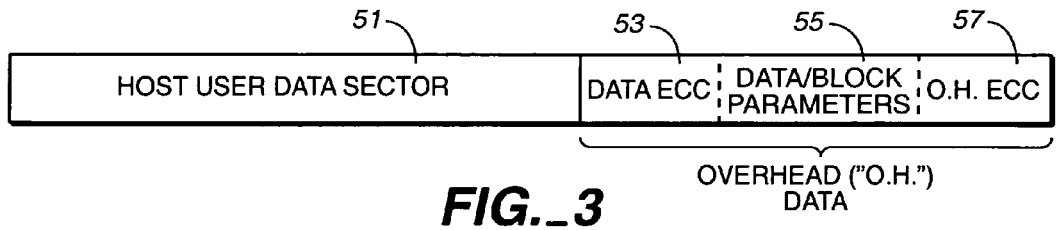
FIG._3

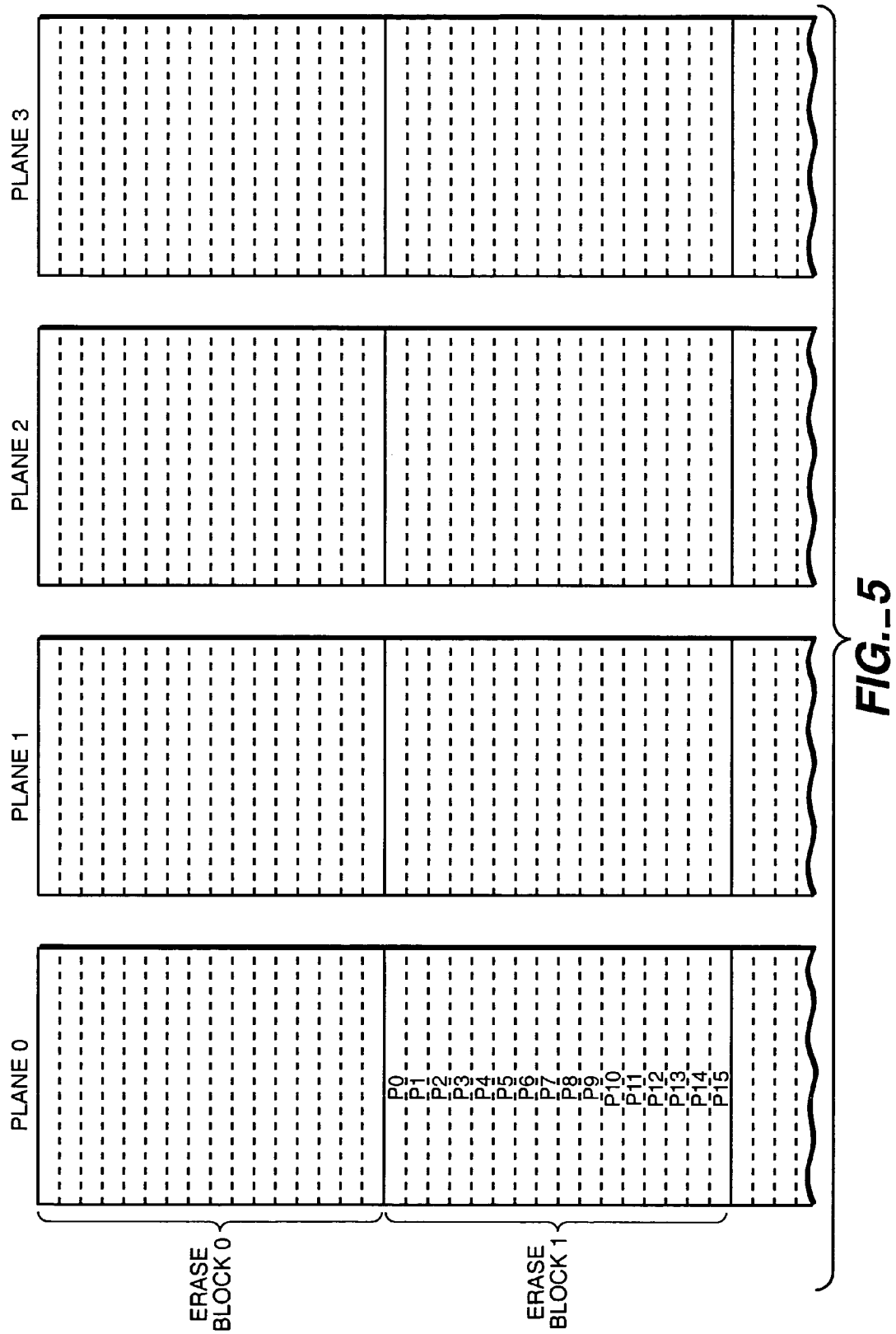
FIG._5

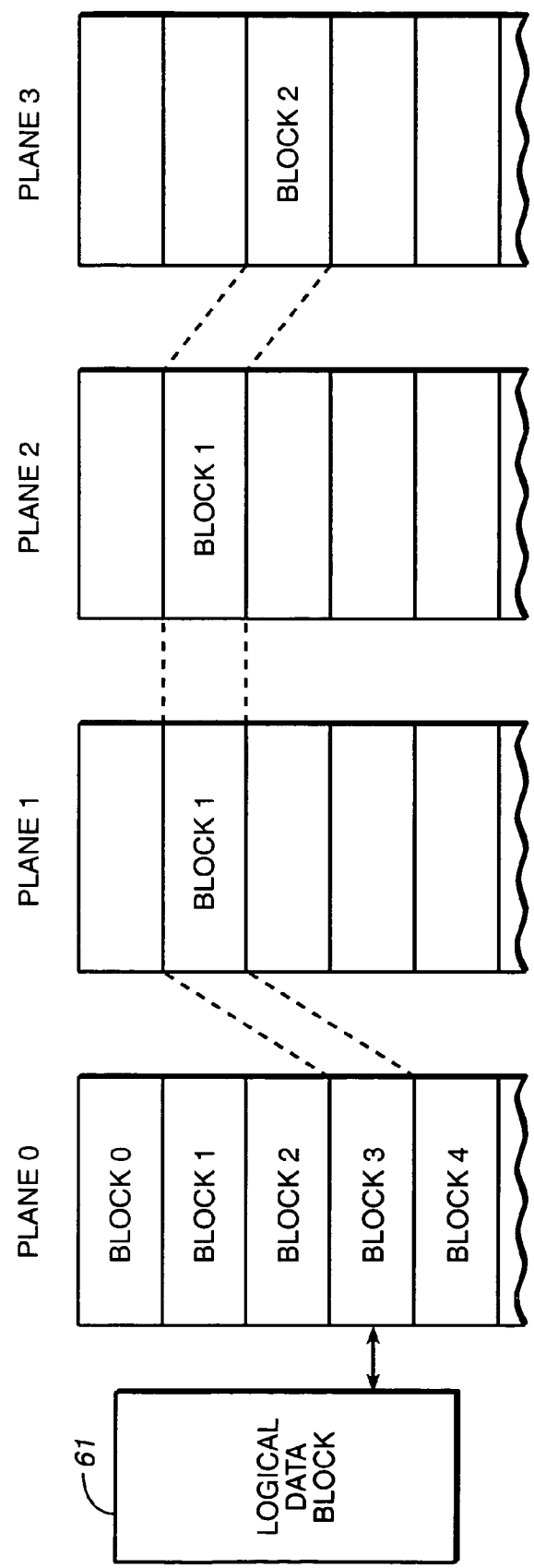
FIG._6

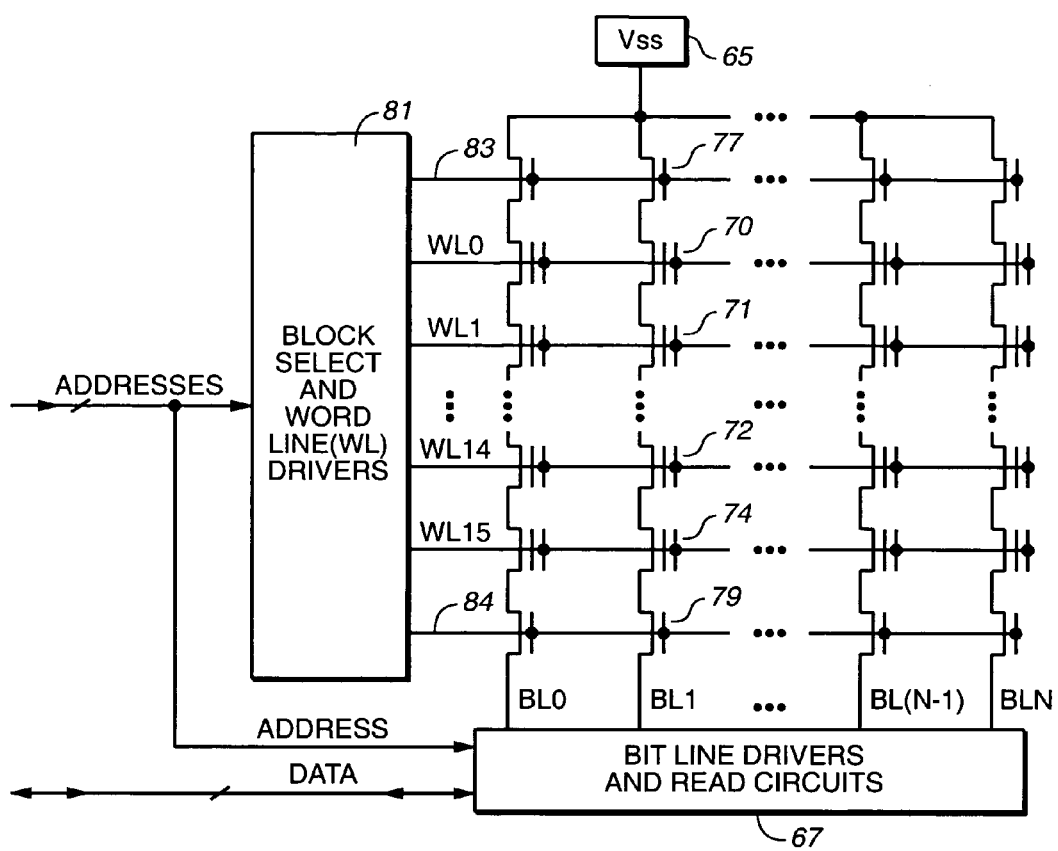
FIG._7

Active Block 800

| Sector 0 | Sector 1 | Sector 2 | Sector 3 | |
|---|---|---|---|---|
| X | Erased | Erased | Erased | Page 0 |
| X+1 | Erased | Erased | Erased | Page 1 |
| X+2 | Erased | Erased | Erased | Page 2 |
| X+3 | Erased | Erased | Erased | Page 3 |
| Erased | Erased | Erased | Erased | Page 4 |
| Erased | Erased | Erased | Erased | Page 5 |

*FIG._8*

Active Block 900

| Sector 0 | Sector 1 | Sector 2 | Sector 3 | |
|---|---|---|---|---|
| X | Erased | Erased | Erased | Page 0 |
| X | X+1 | Erased | Erased | Page 1 |
| X | X+1 | X+2 | Erased | Page 2 |
| X | X+1 | X+2 | X+3 | Page 3 |
| Erased | Erased | Erased | Erased | Page 4 |
| Erased | Erased | Erased | Erased | Page 5 |

*FIG._9*

Active Block 1000 (After First Garbage Collection)

| Sector 0 | Sector 1 | Sector 2 | Sector 3 | |
|---|---|---|---|---|
| X | X+1 | X+2 | X+3 | Page 0 |
| X+4 | Erased | Erased | Erased | Page 1 |
| X+5 | Erased | Erased | Erased | Page 2 |
| X+6 | Erased | Erased | Erased | Page 3 |
| X+7 | Erased | Erased | Erased | Page 4 |
| Erased | Erased | Erased | Erased | Page 5 |

*FIG._10A*

Active Block 1010 (After Second Garbage collection)

| Sector 0 | Sector 1 | Sector 2 | Sector 3 | |
|---|---|---|---|---|
| X | X+1 | X+2 | X+3 | Page 0 |
| X+4 | X+5 | X+6 | X+7 | Page 1 |
| Erased | Erased | Erased | Erased | Page 2 |
| Erased | Erased | Erased | Erased | Page 3 |
| Erased | Erased | Erased | Erased | Page 4 |
| Erased | Erased | Erased | Erased | Page 5 |

*FIG._10B*

Active Block 1010 (After Receipt of Additional Sectors)

| Sector 0 | Sector 1 | Sector 2 | Sector 3 | |
|---|---|---|---|---|
| X | X+1 | X+2 | X+3 | Page 0 |
| X+4 | X+5 | X+6 | X+7 | Page 1 |
| X+8 | Erased | Erased | Erased | Page 2 |
| X+9 | Erased | Erased | Erased | Page 3 |
| X+10 | Erased | Erased | Erased | Page 4 |
| X+11 | Erased | Erased | Erased | Page 5 |

*FIG._10C*

Active Block 1110

| | Sector 0 | Sector 1 | Sector 2 | Sector 3 | |
|---|---|---|---|---|---|
| | X | X+1 | X+2 | X+3 | Page 0 |
| | X+4 | X+5 | X+6 | X+7 | Page 1 |
| | Erased | Erased | Erased | Erased | Page 2 |
| | Erased | Erased | Erased | Erased | Page 3 |
| | Erased | Erased | Erased | Erased | Page 4 |
| | Erased | Erased | Erased | Erased | Page 5 |

Scratch Pad Block 1120

| | Sector 0 | Sector 1 | Sector 2 | Sector 3 | |
|---|---|---|---|---|---|
| | X | Erased | Erased | Erased | Page 0 |
| | X | X+1 | Erased | Erased | Page 1 |
| | X | X+1 | X+2 | Erased | Page 2 |
| | X+4 | Erased | Erased | Erased | Page 3 |
| | X+4 | X+5 | Erased | Erased | Page 4 |
| | X+4 | X+5 | X+6 | Erased | Page 5 |

FIG._11A

Active Block 1130

| Sector 0 | Sector 1 | Sector 2 | Sector 3 | |
|---|---|---|---|---|
| X | X+1 | X+2 | X+3 | Metapage 0 |
| X+4 | X+5 | X+6 | X+7 | Metapage 1 |
| Erased | Erased | Erased | Erased | Metapage 2 |
| Erased | Erased | Erased | Erased | Metapage 3 |
| Erased | Erased | Erased | Erased | Metapage 4 |
| Erased | Erased | Erased | Erased | Metapage 5 |
| Plane 0 | Plane 1 | Plane 2 | Plane 3 | |

Scratch Pad Block 1140

| Sector 0 | Sector 1 | Sector 2 | Sector 3 | |
|---|---|---|---|---|
| X | Erased | Erased | Erased | Metapage 0 |
| X | X+1 | Erased | Erased | Metapage 1 |
| X | X+1 | X+2 | Erased | Metapage 2 |
| X+4 | Erased | Erased | Erased | Metapage 3 |
| X+4 | X+5 | Erased | Erased | Metapage 4 |
| X+4 | X+5 | X+6 | Erased | Metapage 5 |
| Plane 0 | Plane 1 | Plane 2 | Plane 3 | |

FIG._11B

Active Block 1252

| | Sector 0 | Sector 1 | Sector 2 | Sector 3 | |
|---|---|---|---|---|---|
| | $X_1$ | $(X+1)_1$ | $(X+2)_1$ | $(X+3)_0$ | Page 0 |
| | Erased | Erased | Erased | Erased | Page 1 |
| | Erased | Erased | Erased | Erased | Page 2 |
| | Erased | Erased | Erased | Erased | Page 3 |
| | Erased | Erased | Erased | Erased | Page 4 |
| | Erased | Erased | Erased | Erased | Page 5 |
| | Erased | Erased | Erased | Erased | Page 6 |
| | Erased | Erased | Erased | Erased | Page 7 |
| | Erased | Erased | Erased | Erased | Page 8 |
| | Erased | Erased | Erased | Erased | Page 9 |
| | Erased | Erased | Erased | Erased | ... |
| | Erased | Erased | Erased | Erased | Page N-1 |

Scratch Pad Block 1250

| | Sector 0 | Sector 1 | Sector 2 | Sector 3 | |
|---|---|---|---|---|---|
| | $X_0$ | Erased | Erased | Erased | Page 0 |
| | $X_1$ | Erased | Erased | Erased | Page 1 |
| | $X_1$ | $(X+1)_0$ | Erased | Erased | Page 2 |
| | $X_1$ | $(X+1)_1$ | Erased | Erased | Page 3 |
| | $X_1$ | $(X+1)_1$ | $(X+2)_0$ | Erased | Page 4 |
| | $X_1$ | $(X+1)_1$ | $(X+2)_1$ | Erased | Page 5 |
| | Erased | Erased | Erased | Erased | Page 6 |
| | Erased | Erased | Erased | Erased | Page 7 |
| | Erased | Erased | Erased | Erased | Page 8 |
| | Erased | Erased | Erased | Erased | Page 9 |
| | Erased | Erased | Erased | Erased | ... |
| | Erased | Erased | Erased | Erased | Page N-1 |

*FIG._12A*

Active Block 1252

| | Sector 0 | Sector 1 | Sector 2 | Sector 3 | |
|---|---|---|---|---|---|
| | $X_1$ | $(X+1)_1$ | $(X+2)_1$ | $(X+3)_1$ | Page 0 |
| | Erased | Erased | Erased | Erased | Page 1 |
| | Erased | Erased | Erased | Erased | Page 2 |
| | Erased | Erased | Erased | Erased | Page 3 |
| | Erased | Erased | Erased | Erased | Page 4 |
| | Erased | Erased | Erased | Erased | Page 5 |
| | Erased | Erased | Erased | Erased | Page 6 |
| | Erased | Erased | Erased | Erased | Page 7 |
| | Erased | Erased | Erased | Erased | Page 8 |
| | Erased | Erased | Erased | Erased | Page 9 |
| | Erased | Erased | Erased | Erased | ... |
| | Erased | Erased | Erased | Erased | Page N-1 |

Scratch Pad Block 1250

| | Sector 0 | Sector 1 | Sector 2 | Sector 3 | |
|---|---|---|---|---|---|
| | $X_0$ | Erased | Erased | Erased | Page 0 |
| | $X_1$ | Erased | Erased | Erased | Page 1 |
| | $X_1$ | $(X+1)_0$ | Erased | Erased | Page 2 |
| | $X_1$ | $(X+1)_1$ | Erased | Erased | Page 3 |
| | $X_1$ | $(X+1)_1$ | $(X+2)_0$ | Erased | Page 4 |
| | $X_1$ | $(X+1)_1$ | $(X+2)_1$ | Erased | Page 5 |
| | $X_1$ | $(X+1)_1$ | $(X+2)_1$ | $(X+3)_0$ | Page 6 |
| | $X_1$ | $(X+1)_1$ | $(X+2)_1$ | $(X+3)_1$ | Page 7 |
| | $(X+4)_0$ | Erased | Erased | Erased | Page 8 |
| | Erased | Erased | Erased | Erased | Page 9 |
| | Erased | Erased | Erased | Erased | ... |
| | Erased | Erased | Erased | Erased | Page N-1 |

*FIG._12B*

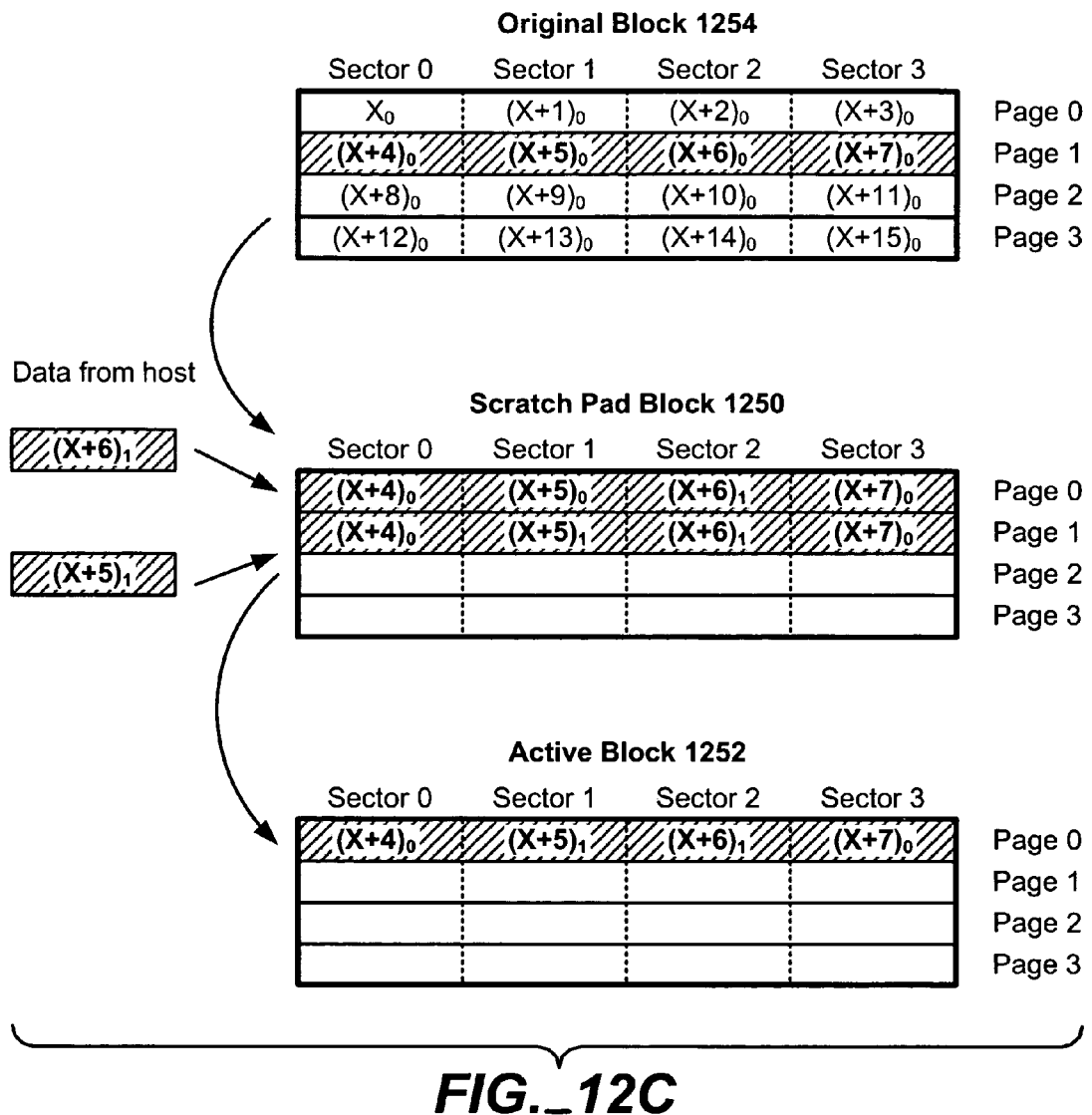
FIG._12C
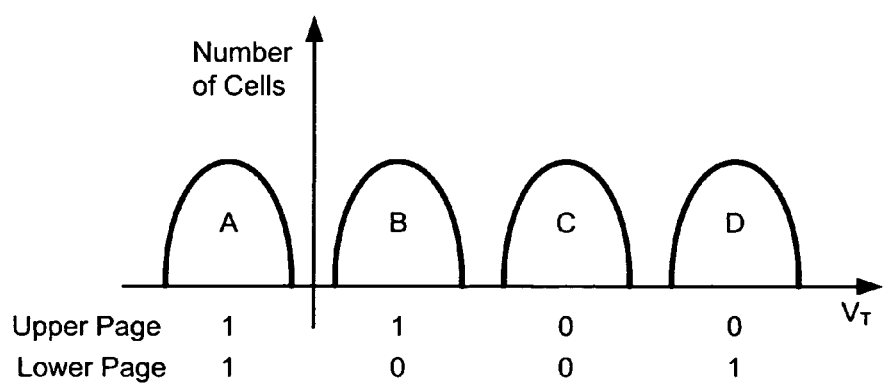
FIG._13

Scratch Pad Block 1460

| Sector 0 | Sector 1 | Sector 2 | Sector 3 | |
|---|---|---|---|---|
| X | X+1 | X+2 | X+3 | Page 0 - Lower |
| X+8 | X+9 | X+10 | X+11 | Page 0 - Upper |
| X+16 | X+17 | X+18 | X+19 | Page 1 - Lower |
| X+24 | X+25 | X+26 | X+27 | Page 1 - Upper |
| Erased | Erased | Erased | Erased | Page 2 - Lower |
| Erased | Erased | Erased | Erased | Page 2 - Upper |
| Erased | Erased | Erased | Erased | Page 3 - Lower |
| Erased | Erased | Erased | Erased | Page 3 - Upper |

Active Block 1462

| Sector 0 | Sector 1 | Sector 2 | Sector 3 | |
|---|---|---|---|---|
| X | X+1 | X+2 | X+3 | Page 0 - Lower |
| X+4 | X+5 | X+6 | X+7 | Page 0 - Upper |
| X+8 | X+9 | X+10 | X+11 | Page 1 - Lower |
| X+12 | X+13 | X+14 | X+15 | Page 1 - Upper |
| X+16 | X+17 | X+18 | X+19 | Page 2 - Lower |
| X+20 | X+21 | X+22 | X+23 | Page 2 - Upper |
| X+24 | X+25 | X+26 | X+27 | Page 3 - Lower |
| X+28 | X+29 | X+30 | X+31 | Page 3 - Upper |

*FIG._14*

Original Block 1570

| | Sector 0 | Sector 1 | Sector 2 | Sector 3 | |
|---|---|---|---|---|---|
| End of File 1 | 0 | 1 | 2 | 3 | Page 0 |
| | 4 | 5 | 6 | 7 | Page 1 |
| | ... | ... | ... | ... | ... |
| | ... | ... | ... | ... | ... |
| | ... | ... | ... | ... | ... |
| | (i*4)-4 | (i*4)-3 | (i*4)-2 | (i*4)-1 | Page i-1 |
| Start of File 2 | (i*4) | (i*4)+1 | (i*4)+2 | (i*4)+3 | Page i |
| | (i*4)+4 | (i*4)+5 | (i*4)+6 | (i*4)+7 | Page i+1 |
| | ... | ... | ... | ... | ... |
| | ... | ... | ... | ... | ... |
| | ... | ... | ... | ... | ... |
| | N-4 | N-3 | N-2 | N-1 | Page n-1 |

New Block 1572

| Sector 0 | Sector 1 | Sector 2 | Sector 3 | |
|---|---|---|---|---|
| (i*4) | (i*4)+1 | (i*4)+2 | (i*4)+3 | Page 0 |
| (i*4)+4 | (i*4)+5 | (i*4)+6 | (i*4)+7 | Page 1 |
| ... | ... | ... | ... | ... |
| ... | ... | ... | ... | ... |
| ... | ... | ... | ... | ... |
| N-4 | N-3 | N-2 | N-1 | Page i-1 |
| 0 | 1 | 2 | 3 | Page i |
| 4 | 5 | 6 | 7 | Page i+1 |
| ... | ... | ... | ... | ... |
| ... | ... | ... | ... | ... |
| ... | ... | ... | ... | ... |
| (i*4)-4 | (i*4)-3 | (i*4)-2 | (i*4)-1 | Page n-1 |

| (i*4) | (i*4)+1 |
|---|---|

*FIG._15*

Scratch Pad Block 1674

| Sector 0 | Sector 1 | Sector 2 | Sector 3 | |
|---|---|---|---|---|
| (i*4)+2 | (i*4)+3 | Erased | Erased | Page 0 |
| Erased | Erased | Erased | Erased | Page 1 |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |
| Erased | Erased | Erased | Erased | Page n-1 |

New Block 1676

| Sector 0 | Sector 1 | Sector 2 | Sector 3 | |
|---|---|---|---|---|
| (i*4)+4 | (i*4)+5 | (i*4)+6 | (i*4)+7 | Page 0 |
| ... | ... | ... | ... | ... |
| ... | ... | ... | ... | ... |
| ... | ... | ... | ... | ... |
| N-4 | N-3 | N-2 | N-1 | Page n-i |
| 0 | 1 | 2 | 3 | Page n-i+1 |
| 7 | 6 | 5 | 4 | Page n-i+2 |
| ... | ... | ... | ... | ... |
| ... | ... | ... | ... | ... |
| ... | ... | ... | ... | ... |
| (i*4)-4 | (i*4)-3 | (i*4)-2 | (i*4)-1 | Page n-2 |
| (i*4) | (i*4)+1 | (i*4)+2 | (i*4)+3 | Page n-1 |

*FIG._16*

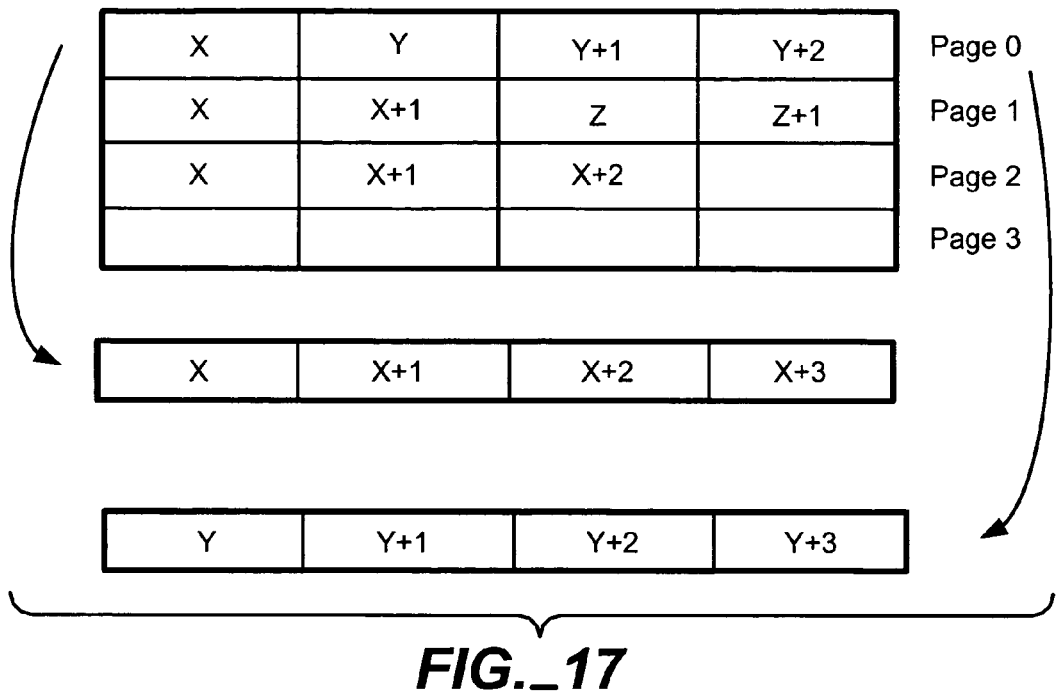
FIG._17
FIG._18

Scratch Pad Block 2100

| | Sector 0 | Sector 1 | Sector 2 | Sector 3 | |
|---|---|---|---|---|---|
| 2110 → | Marking Sector | Erased | Erased | Erased | Page 0 |
| | Erased | Erased | Erased | Erased | Page 1 |
| | Erased | Erased | Erased | Erased | Page 2 |
| | Erased | Erased | Erased | Erased | Page 3 |
| | Erased | Erased | Erased | Erased | Page 4 |
| | Erased | Erased | Erased | Erased | Page 5 |

FIG._19

Scratch Pad Block 2100

| | Sector 0 | Sector 1 | Sector 2 | Sector 3 | |
|---|---|---|---|---|---|
| 2110 → | Marking Sector | Group 1 Sec 1 2220 | Group 1 Sec 2 2221 | Index Sector 2230 | Page 0 |
| | Erased | Erased | Erased | Erased | Page 1 |
| | Erased | Erased | Erased | Erased | Page 2 |
| | Erased | Erased | Erased | Erased | Page 3 |
| | Erased | Erased | Erased | Erased | Page 4 |
| | Erased | Erased | Erased | Erased | Page 5 |

FIG._20

Scratch Pad Block 2100

| Sector 0 | Sector 1 | Sector 2 | Sector 3 | |
|---|---|---|---|---|
| Marking Sector | Group 1 Sec 1 | Group 1 Sec 2 | Index Sector 2230 | Page 0 |
| Group 2 Sec 1 2340 | Group 2 Sec 2 2341 | Index Sector 2350 | Erased | Page 1 |
| Erased | Erased | Erased | Erased | Page 2 |
| Erased | Erased | Erased | Erased | Page 3 |
| Erased | Erased | Erased | Erased | Page 4 |
| Erased | Erased | Erased | Erased | Page 5 |

FIG._21

Scratch Pad Block 2100

| | Sector 0 | Sector 1 | Sector 2 | Sector 3 | |
|---|---|---|---|---|---|
| | Marking Sector | Group 1 Sec 1 | Group 1 Sec 2 | Index Sector | Page 0 |
| | Group 2 Sec 1 | Group 2 Sec 2 | Index Sector 2350 | Group 3 Sec 1 2460 | Page 1 |
| | Group 3 Sec 2 2461 | Group 3 Sec 3 2462 | Index Sector 2470 | Erased | Page 2 |
| | Erased | Erased | Erased | Erased | Page 3 |
| | Erased | Erased | Erased | Erased | Page 4 |
| | Erased | Erased | Erased | Erased | Page 5 |

*FIG._22*

Scratch Pad Block 2100

| | Sector 0 | Sector 1 | Sector 2 | Sector 3 | |
|---|---|---|---|---|---|
| | Marking Sector | Group 1 Sec 1 | Group 1 Sec 2 | Index Sector | Page 0 |
| | Group 2 Sec 1 | Group 2 Sec 2 | Index Sector | Group 3 Sec 1 | Page 1 |
| | Group 3 Sec 2 | Group 3 Sec 3 | Index Sector | Index Sector 2560 | Page 2 |
| | Erased | Erased | Erased | Erased | Page 3 |
| | Erased | Erased | Erased | Erased | Page 4 |
| | Erased | Erased | Erased | Erased | Page 5 |

*FIG._23*

SCRATCH PAD BLOCK

BACKGROUND

This invention relates generally to the operation of non-volatile flash memory systems, and, more specifically, to more efficient methods of programming data within a non-volatile flash memory.

There are many commercially successful non-volatile memory products being used today, particularly in the form of small form factor cards, which employ an array of flash EEPROM (Electrically Erasable and Programmable Read Only Memory) cells formed on one or more integrated circuit chips. A memory controller, usually but not necessarily on a separate integrated circuit chip, interfaces with a host to which the card is removably connected and controls operation of the memory array within the card. Such a controller typically includes a microprocessor, some non-volatile read-only-memory (ROM), a volatile random-access-memory (RAM) and one or more special circuits such as one that calculates an error-correction-code (ECC) from data as they pass through the controller during the programming and reading of data. Some of the commercially available cards are CompactFlash™ (CF) cards, MultiMedia cards (MMC), Secure Digital (SD) cards, personnel tags (P-Tag) and Memory Stick cards. Hosts include personal computers, notebook computers, personal digital assistants (PDAs), various data communication devices, digital cameras, cellular telephones, portable audio players, automobile sound systems, and similar types of equipment. In some systems, a removable card does not include a controller and the host controls operation of the memory array in the card. Examples of this type of memory system include Smart Media cards and xD cards. Thus, control of the memory array may be achieved by software on a controller in the card or by control software in the host. Besides the memory card implementation, this type of memory can alternatively be embedded into various types of host systems. In both removable and embedded applications, host data may be stored in the memory array according to a storage scheme implemented by memory control software.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems and methods of manufacturing them are given in U.S. Pat. Nos. 5,070,032, 5,095,344, 5,313,421, 5,315,541, 5,343,063, 5,661,053 and 6,222,762. These patents, along with all other patents and patent applications referenced in this application are hereby incorporated by reference in their entirety.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architecture arrays and their operation as part of a memory system are found in U.S. Pat. Nos. 5,570,315, 5,774,397, 6,046,935, and 6,522,580.

The charge storage elements of current flash EEPROM arrays, as discussed in the foregoing referenced patents, are most commonly electrically conductive floating gates, typically formed from conductively doped polysilicon material. An alternate type of memory cell useful in flash EEPROM systems utilizes a non-conductive dielectric material in place of the conductive floating gate to store charge in a non-volatile manner. A triple layer dielectric formed of silicon oxide, silicon nitride and silicon oxide (ONO) is sandwiched between a conductive control gate and a surface of a semi-conductive substrate above the memory cell channel. The cell is programmed by injecting electrons from the cell channel into the nitride, where they are trapped and stored in a limited region, and erased by injecting hot holes into the nitride. Several specific cell structures and arrays employing dielectric storage elements and are described in United States patent application publication no. 2003/0109093 of Harari et al.

As in most all integrated circuit applications, the pressure to shrink the silicon substrate area required to implement some integrated circuit function also exists with flash EEPROM memory cell arrays. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage unit or element. This is accomplished by dividing a window of a storage element charge level voltage range into more than two states. The use of four such states allows each cell to store two bits of data, eight states stores three bits of data per storage element, and so on. Multiple state flash EEPROM structures using floating gates and their operation are described in U.S. Pat. Nos. 5,043,940 and 5,172,338, and for structures using dielectric floating gates in aforementioned United States patent application publication no. 2003/0109093. Selected portions of a multi-state memory cell array may also be operated in two states (binary) for various reasons, in a manner described in U.S. Pat. Nos. 5,930,167 and 6,456,528, which patents, along with all patents and patent applications cited in this application, are hereby incorporated by reference in their entirety.

Memory cells of a typical flash EEPROM array are divided into discrete blocks of cells that are erased together (an erase block). That is, the erase block is the erase unit, a minimum number of cells that are simultaneously erasable. Each erase block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the erase block in which they are stored. Such memories are typically configured with 16, 32 or more pages within each erase block, and each page stores one or just a few host sectors of data.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

To further efficiently manage the memory, erase blocks may be linked together to form virtual blocks or metablocks. That is, each metablock is defined to include one erase block from each plane. Use of the metablock is described in U.S. Pat. No. 6,763,424. The metablock is identified by a host logical block address as a destination for programming and reading data. Similarly, all erase blocks of a metablock are erased together. A metablock may be programmed in a unit of a metapage that comprises one page from each erase block in a metablock. The controller in a memory system operated with such large blocks and/or metablocks performs a number of functions including the translation between logical block addresses (LBAs) received from a host, and physical block numbers (PBNs) within the memory cell array. Individual pages within erase blocks are typically identified by offsets within the block address. Address translation often involves use of intermediate terms of a logical block number (LBN) and logical page. In a memory system using metablocks, the metablock may be the effective minimum unit of erase of the memory array. Thus, the minimum unit of erase (a block) may be either an erase block or a metablock depending on the memory architecture. The term "block" may refer to either an erase block or a metablock depending on the architecture. Similarly, the term "page" may refer to the minimum unit of programming of the memory system. This may be a page within a single erase block or may be a metapage that extends across several erase blocks depending on the architecture of the memory system.

Data stored in a metablock are often updated, the likelihood of updates increases as the data capacity of the metablock increases. Updated sectors of one metablock are normally written to another metablock. The unchanged sectors are usually also copied from the original to the new metablock, as part of the same programming operation, to consolidate the data. Alternatively, the unchanged data may remain in the original metablock until later consolidation with the updated data into a single metablock again. Operations to consolidate current data to a new block and erase a block containing only obsolete data are generally referred to as "garbage collection" operations.

It is common to operate large block or metablock systems with some extra blocks maintained in an erased block pool. When one or more pages of data less than the capacity of a block are being updated, it is typical to write the updated pages to an erased block from the pool and then copy data of the unchanged pages from the original block to erase pool block. Variations of this technique are described in aforementioned U.S. Pat. No. 6,763,424. Over time, as a result of host data files being re-written and updated, many blocks can end up with a relatively few number of its pages containing valid data and remaining pages containing data that is no longer current. In order to be able to efficiently use the data storage capacity of the array, logically related data pages of valid data are from time-to-time gathered together from fragments among multiple blocks and consolidated together into a fewer number of blocks. This process is commonly termed "garbage collection."

In some memory systems, the physical memory cells are also grouped into two or more zones. A zone may be any partitioned subset of the physical memory or memory system into which a specified range of logical block addresses is mapped. For example, a memory system capable of storing 64 Megabytes of data may be partitioned into four zones that store 16 Megabytes of data per zone. The range of logical block addresses is then also divided into four groups, one group being assigned to the physical blocks of each of the four zones. Logical block addresses are constrained, in a typical implementation, such that the data of each are never written outside of a single physical zone into which the logical block addresses are mapped. In a memory cell array divided into planes (sub-arrays), which each have their own addressing, programming and reading circuits, each zone preferably includes blocks from multiple planes, typically the same number of blocks from each of the planes. Zones are primarily used to simplify address management such as logical to physical translation, resulting in smaller translation tables, less RAM memory needed to hold these tables, and faster access times to address the currently active region of memory, but because of their restrictive nature can result in less than optimum wear leveling.

Individual flash EEPROM cells store an amount of charge in a charge storage element or unit that is representative of one or more bits of data. The charge level of a storage element controls the threshold voltage (commonly referenced as $V_T$) of its memory cell, which is used as a basis of reading the storage state of the cell. A threshold voltage window is commonly divided into a number of ranges, one for each of the two or more storage states of the memory cell. These ranges are separated by guardbands that include a nominal sensing level that allows determining the storage states of the individual cells. These storage levels do shift as a result of charge disturbing programming, reading or erasing operations performed in neighboring or other related memory cells, pages or blocks. Error correcting codes (ECCs) are therefore typically calculated by the controller and stored along with the host data being programmed and used during reading to verify the data and perform some level of data correction if necessary. Also, shifting charge levels can be restored back to the centers of their state ranges from time-to-time, before disturbing operations cause them to shift completely out of their defined ranges and thus cause erroneous data to be read. This process, termed data refresh or scrub, is described in U.S. Pat. Nos. 5,532,962 and 5,909,449.

In some memory arrays, a page may consist of a portion of an erase block that can hold multiple sectors of data. Once the page has been written, no further writing may be possible without corrupting the data that is already written. For memory arrays using such a system, a page may be defined by a set of memory cells that are connected to the same word line. Such memory arrays may be inefficiently programmed where data is received in amounts that are less than the size of a page. For example, where data is received one sector at a time, just one sector may be programmed to a page. No additional data may be programmed to the page without risk of corrupting the sector of data that is already saved there. Sometimes a series of single sectors may be received with some delay between them. In this case, each sector is written to a separate page of the memory array. Thus, the sectors are stored in a way that is inefficient in how it uses space in the memory array. Where multi-level logic is used, memory cells are particularly sensitive to the effects of later programming of nearby cells. In addition, programming of multi-level cells is generally done by programming a group of cells with a first page of data and later programming the cells with a second page of data. The programming of the second page of data may cause corruption of the first page of data in some cases. Hence, there is a need for a more efficient way to store data in a memory array that has a multi-sector page when the memory array receives data in amounts that are less than a page. There is also a need for a way to prevent corruption of data of a first page during programming of a subsequent page when programming a group of multi-level cells.

SUMMARY

In a memory array having a block as the unit of erase, one or more blocks may be designated as scratch pad blocks and may be used to improve performance of the memory system. A scratch pad block may operate as a buffer so that data is written to the scratch pad block with a low degree of parallelism and then copied to another location within the memory array with a high degree of parallelism. Data may be accumulated in the scratch pad block until it may be more efficiently written to another location. In memories having multi-sector pages, sectors may be accumulated until a full page may be written using the maximum parallelism of the system. In multi-level cell memories, a lower page may be stored in a scratch pad block until the upper page is available so that the upper and lower pages are stored together.

The degree of parallelism of a particular program operation is proportional to the number of bits of data that are programmed together. Thus, programming a large amount of data together is considered a write with high parallelism, while programming a small amount of data together is considered low parallelism. Where parallelism of less than a page is used, space in the memory array may be wasted and this wasted space means that garbage collection must be performed more often thus adversely affecting the efficiency of the memory system. Sometimes, small amounts of data must be stored in the memory system. By writing these small writes in one location, a scratch pad block, and later writing them together with higher parallelism to another location, the efficiency of the memory system may be improved.

In a memory system having a minimum unit of program of a page that consists of multiple sectors of data, a method of storing data that are received in amounts that are less than one page is disclosed. A block designated as a scratch pad block is used to store received sectors until a complete page may be written to the flash memory array. A first sector is stored in a first page of the scratch pad block. Subsequently received sectors may be stored in additional pages of the scratch pad block. Individually received sectors or groups of sectors are saved in a new page of the scratch pad block when they are received. Previously stored sectors from other pages in the scratch pad block may be copied to the latest page along with the new data. Thus, sectors of data are accumulated in the scratch pad block as long as there is less than a full page of new data in a page of the scratch pad block. Sectors are written to the scratch pad block with a lower degree of parallelism than the maximum available parallelism for the block. Sectors may be updated while stored in the scratch pad block. When a new sector of data is received that results in a full page of data being available for programming, the new sector and the sectors previously stored in the scratch pad block may be programmed together to the same page in another block of the memory array. This page is fully populated with data and is written with the maximum available parallelism. The data stored in the scratch pad block may then be marked as obsolete and may be erased at a convenient time. Thus, space in the flash memory is more efficiently used and the frequency of garbage collection operations is reduced.

In memories having multi-level cells, a scratch pad block may store a page of data that is also written to an active block. The stored page may be kept in the scratch pad block until another page of data is received so that the two pages of data may be written together to their destination in an active block. They may be written as an upper and lower page together using a high degree of parallelism and with a lower risk of corrupting data than if they were written separately. The scratch pad block may also be used to retain a copy of a previously programmed lower page during programming of the associated upper page so that if there is a loss of power, the data in the lower page may be recovered from the scratch pad block.

A scratch pad block may allow temporary storage of data that is to be written to another location. Data may be stored in a scratch pad block during updating of sectors of data of a block. Where a page within a block contains sectors of data from different files, the page is updated when either block is updated. It may require more than one block to store the updated data from the two files using conventional methods because two copies of the multi-file page may be needed. Using a scratch pad block allows part of the page from one file to be stored until the remainder of the page (from the other file) is available. Then, the complete updated page is programmed to its destination using maximum parallelism.

A scratch pad block may contain sectors of unrelated data. Both host data sectors and control data sectors may be stored in a scratch pad block. Both host data sectors and control data sectors may be stored in the same page within a scratch pad block. Sectors from two different files or from logically remote portions of the same file may be stored in the same page of a scratch pad block. This may allow programming of the scratch pad block with maximum parallelism so that high speed is maintained as data is received. Where data is received at a low speed, the additional space in a page may be occupied by sectors containing control data. This may allow control data structures to be updated less frequently thus reducing the frequency of garbage collection.

A scratch pad may be identified by a marking sector so that a controller may easily identify it. An index of data stored in a scratch pad block may be maintained in an index sector which itself is stored in the scratch pad block. As new sectors are stored in the scratch pad block the index sector is updated by replacing the old index sector with a new index sector. Similarly, as sectors in the scratch pad block are copied to other locations, the index sector may be updated to indicate that these sectors in the scratch pad block are obsolete.

BRIEF DESCRIPTION OF THE DRAWINGS

FIGS. 1A and 1B are block diagrams of a non-volatile memory and a host system, respectively, that operate together.

FIG. 2 illustrates a first example organization of the memory array of FIG. 1A.

FIG. 3 shows an example host data sector with overhead data as stored in the memory array of FIG. 1A.

FIG. 4 illustrates a second example organization of the memory array of FIG. 1A.

FIG. 5 illustrates a third example organization of the memory array of FIG. 1A.

FIG. 6 shows an extension of the third example organization of the memory array of FIG. 1A.

FIG. 7 is a circuit diagram of a group of memory cells of the array of FIG. 1A in one particular configuration.

FIG. 8 shows storage of sectors of data in a block of a memory array such as the memory array of FIG. 1A.

FIG. 9 shows an alternative storage of sectors of data in a block of a memory array such as the memory array of FIG. 1A.

FIG. 10A shows sectors of data of FIGS. 8 or 9 after copying to another block during a garbage collection operation.

FIG. 10B shows sectors of data of FIG. 10A after copying to another block during a second garbage collection operation.

FIG. 10C shows the block of FIG. 10B after more sectors of data are received.

FIG. 11A shows an alternative storage arrangement using two erase blocks, an active block and a scratch pad block, to store the sectors of data of FIGS. 10A and 10B.

FIG. 11B shows an alternative storage arrangement using two metablocks, an active block and a scratch pad block, to store sectors of data of FIGS. 10A and 10B.

FIG. 12A shows two blocks, an active block and a scratch pad block, used to store sectors of data so that the sectors of data may be updated while stored without triggering a garbage collection operation.

FIG. 12B shows an alternative storage system to that of FIG. 12A allowing all sectors of a page to be updated while stored without triggering a garbage collection.

FIG. 12C shows another example of updating data using scratch pad block 1250.

FIG. 13 shows four threshold voltage ranges used to store two bits of data in a multi-level cell.

FIG. 14 shows two blocks of multi-level cells, an active block and a scratch pad block, where the scratch pad block keeps a copy of a lower page of an active block.

FIG. 15 shows sectors of data from two files stored in a block and the subsequent storage of the sectors of data when the two files are updated requiring more than one block of space in the memory array.

FIG. 16 shows an alternative system of updating the sectors of data of FIG. 15 where a scratch pad block stores some sectors before they are copied to an active block.

FIG. 17 shows a scratch pad block storing sectors of unrelated data in the same page and the subsequent copying of this data to different locations.

FIG. 18 shows a scratch pad block storing sectors of unrelated data undergoing multiple updates.

FIG. 19 shows a scratch pad block identified by a marking sector.

FIG. 20 shows the scratch pad block of FIG. 19 storing a group of sectors and an index sector.

FIG. 21 shows the scratch pad block of FIG. 20 storing a second group of sectors and a second index sector that supersedes the first index sector.

FIG. 22 shows the scratch pad block of FIG. 21 storing a third group of sectors and a third index sector that supersedes the second index sector.

FIG. 23 shows the scratch pad block of FIG. 22 with a fourth index sector that supersedes the third index sector when a group is copied to another block.

DESCRIPTION OF EXEMPLARY EMBODIMENTS

Memory Architectures and Their Operation

Referring initially to FIG. 1A, a flash memory includes a memory cell array and a controller. In the example shown, two integrated circuit devices (chips) 11 and 13 include an array 15 of memory cells and various logic circuits 17. The logic circuits 17 interface with a controller 19 on a separate chip through data, command and status circuits, and also provide addressing, data transfer and sensing, and other support to the array 13. A number of memory array chips can be from one to many, depending upon the storage capacity provided. The controller and part or the entire array can alternatively be combined onto a single integrated circuit chip but this is currently not an economical alternative.

A typical controller 19 includes a microprocessor 21, a read-only-memory (ROM) 23 primarily to store firmware and a buffer memory (RAM) 25 primarily for the temporary storage of user data either being written to or read from the memory chips 11 and 13. Circuits 27 interface with the memory array chip(s) and circuits 29 interface with a host though connections 31. The integrity of data is in this example determined by calculating an ECC with circuits 33 dedicated to calculating the code. As user data is being transferred from the host to the flash memory array for storage, the circuit calculates an ECC from the data and the code is stored in the memory. When that user data are later read from the memory, they are again passed through the circuit 33 which calculates the ECC by the same algorithm and compares that code with the one calculated and stored with the data. If they compare, the integrity of the data is confirmed. If they differ, depending upon the specific ECC algorithm utilized, those bits in error, up to a number supported by the algorithm, can be identified and corrected.

The connections 31 of the memory of FIG. 1A mate with connections 31' of a host system, an example of which is given in FIG. 1B. Data transfers between the host and the memory of FIG. 1A are through interface circuits 35. A typical host also includes a microprocessor 37, a ROM 39 for storing firmware code and RAM 41. Other circuits and subsystems 43 often include a high capacity magnetic data storage disk drive, interface circuits for a keyboard, a monitor and the like, depending upon the particular host system. Some examples of such hosts include desktop computers, laptop computers, handheld computers, palmtop computers, personal digital assistants (PDAs), MP3 and other audio players, digital cameras, video cameras, electronic game machines, wireless and wired telephony devices, answering machines, voice recorders, network routers and others.

The memory of FIG. 1A may be implemented as a small enclosed card containing the controller and all its memory array circuit devices in a form that is removably connectable with the host of FIG. 1B. That is, mating connections 31 and 31' allow a card to be disconnected and moved to another host, or replaced by connecting another card to the host. Alternatively, the memory array devices may be enclosed in a separate card that is electrically and mechanically connectable with a card containing the controller and connections 31. As a further alternative, the memory of FIG. 1A may be embedded within the host of FIG. 1B, wherein the connections 31 and 31' are permanently made. In this case, the memory is usually contained within an enclosure of the host along with other components.

FIG. 2 illustrates a portion of a memory array wherein memory cells are grouped into erase blocks, the cells in each erase block being erasable together as part of a single erase operation, usually simultaneously. An erase block is the minimum unit of erase in this type of memory.

The size of the individual memory cell erase blocks of FIG. 2 can vary but one commercially practiced form includes a single sector of data in an individual erase block. The contents of such a data sector are illustrated in FIG. 3. User data 51 are typically 512 bytes. In addition to the user data 51 are overhead data that includes an ECC 53 calculated from the user data, parameters 55 relating to the sector data and/or the erase block in which the sector is programmed and an ECC 57 calculated from the parameters 55 and any other overhead data that might be included.

One or more flags may also be included in the parameters 55 that indicate status or states. Indications of voltage levels to be used for programming and/or erasing the erase block can also be stored within the parameters 55, these voltages being updated as the number of cycles experienced by the erase block and other factors change. Other examples of the parameters 55 include an identification of any defective cells within the erase block, the logical address of the erase block that is mapped into this physical erase block and the address of any substitute erase block in case the primary erase block is defective. The particular combination of parameters 55 that are used in any memory system will vary in accordance with the design. Also, some or all of the overhead data can be stored in erase blocks dedicated to such a function, rather than in the erase block containing the user data or to which the overhead data pertains.

Different from the single data sector erase block of FIG. 2 is a multi-sector erase block of FIG. 4. An example erase block 59, still the minimum unit of erase, contains four pages 0-3, each of which is the minimum unit of programming. One or more host sectors of data are stored in each page, usually along with overhead data including at least the ECC calculated from the sector's data and may be in the form of the data sector of FIG. 3.

Re-writing the data of an entire block usually involves programming the new data into a block of an erase block pool, the original block then being erased and placed in the erase pool. When data of less than all the pages of a block are updated, the updated data are typically stored in a page of a block from the erased block pool and data in the remaining unchanged pages are copied from the original block into the new block. The original block is then erased. Variations of this large block management technique include writing the updated data into a page of another block without moving data from the original block or erasing it. This results in multiple pages having the same logical address. The most recent page of data is identified by some convenient technique such as the time of programming that is recorded as a field in sector or page overhead data.

A further multi-sector block arrangement is illustrated in FIG. 5. Here, the total memory cell array is physically divided into two or more planes, four planes 0-3 being illustrated. Each plane is a sub-array of memory cells that has its own data registers, sense amplifiers, addressing decoders and the like in order to be able to operate largely independently of the other planes. All the planes may be provided on a single integrated circuit device or on multiple devices, an example being to form each plane from one or more distinct integrated circuit devices. Each block in the example system of FIG. 5 contains 16 pages P0-P15, each page having a capacity of one, two or more host data sectors and some overhead data.

Yet another memory cell arrangement is illustrated in FIG. 6. Each plane contains a large number of erase blocks of cells. In order to increase the degree of parallelism of operation, erase blocks within different planes are logically linked to form metablocks. One such metablock is illustrated in FIG. 6 as being formed of erase block 3 of plane 0, erase block 1 of plane 1, erase block 1 of plane 2 and erase block 2 of plane 3. Each metablock is logically addressable and the memory controller assigns and keeps track of the erase blocks that form the individual metablocks. The host system preferably interfaces with the memory system in units of data equal to the capacity of the individual metablocks. Such a logical data block 61 of FIG. 6, for example, is identified by a logical block addresses (LBA) that is mapped by the controller into the physical block numbers (PBNs) of the blocks that make up the metablock. All erase blocks of the metablock are erased together, and pages from each erase block are preferably programmed and read simultaneously. A metablock may be considered the unit of erase in a system in which erase blocks are linked in this way. In some memory arrays having metablock architecture, pages may only be programmed in parallel with other pages of the metablock. In these memory arrays, a metapage is a minimum unit of programming of a metablock that consists of a page from each plane of the metablock.

There are many different memory array architectures, configurations and specific cell structures that may be employed to implement the memories described above with respect to FIGS. 2-6. One erase block of a memory array of the NAND type is shown in FIG. 7. A large number of column oriented strings of series connected memory cells are connected between a common source 65 of a voltage $V_{SS}$ and one of bit lines BL0-BLN that are in turn connected with circuits 67 containing address decoders, drivers, read sense amplifiers and the like. Specifically, one such string contains charge storage transistors 70, 71 . . . 72 and 74 connected in series between select transistors 77 and 79 at opposite ends of the strings. In this example, each string contains 16 storage transistors but other numbers are possible. Word lines WL0-WL15 extend across one storage transistor of each string and are connected to circuits 81 that contain address decoders and voltage source drivers of the word lines. Voltages on lines 83 and 84 control connection of all the strings in the erase block together to either the voltage source 65 and/or the bit lines BL0-BLN through their select transistors. Data and addresses come from the memory controller.

Each row of charge storage transistors (memory cells) of the erase block may form a page that is programmed and read together. An appropriate voltage is applied to the word line (WL) of such a page for programming or reading its data while voltages applied to the remaining word lines are selected to render their respective storage transistors conductive. In the course of programming or reading one row (page) of storage transistors, previously stored charge levels on unselected rows can be disturbed because of voltages applied across all the strings and to their word lines. This may prevent programming of cells of a particular row after other cells in the row have been programmed. Multiple state flash memories are particularly sensitive to disturbance. The increased number of logic states results in narrow threshold voltage ranges for individual states so that small changes in charge level may produce a change in logic state. As data storage density is increased by using increased numbers of logic states in a cell, sensitivity to disturbance increases. Thus, it may not be possible to program data to cells in a row after other cells in that row are programmed without corrupting the data in the programmed cells. Thus, disturbance from subsequent programming of adjacent cells may define the page size. If cells in a row may not be programmed subsequent to programming other cells in the same row, then the row defines the minimum unit of programming. Thus, a row of cells may contain one page of data. In such a memory array, if a group of cells in a row is programmed, the row is considered programmed even where some cells in the row contain no data. It is not efficient to have empty cells that cannot be subsequently programmed in the memory array.

Empty cells in a programmed page may result from small numbers of sectors being received by the memory system at a time. For example, a single sector may be sent by a host to a memory system. The sector is stored in a page of the flash memory array. The sector prevents subsequent writing to that page. In a memory system in which a page holds multiple sectors, this may be inefficient. For example, where a page comprises four sectors of data, a portion of the memory array that could hold three sectors of data is left empty when a single sector is written to the page. As page sizes increase, the wasted space from such partially filled pages increases. Metapages may contain large numbers of sectors so storage may be particularly inefficient in memory arrays that use metablocks. The problem is similar where two or more sectors are received but the number of sectors received is less than the number of sectors in a page. Such partial pages may be stored in the scratch pad block until a full page of data is received.

Subsequent to writing partially filled pages of data, consolidation of stored data may be performed to combine data from partially filled pages into filled pages. This may be done as part of periodically performed garbage collection. Such consolidation of data copies data from the partially filled pages to full pages that are in a different erase block. The erase blocks that hold the partially filled pages are then marked as obsolete so that they may be erased and reused. Such an operation may take system resources that could be used for other functions.

Example of Single Sector Writes to Memory

FIG. 8 shows an erase block, designated active block 800 of a memory array in a memory system in which a page is comprised of four sectors of data. Pages 0-5 are shown each extending in the horizontal direction. Each page may contain four sectors of data designated as sector 0, sector 1, sector 2 and sector 3. A host sends single sectors of data to the memory system, which are stored in active block 800. Sector X is received and stored as sector 0 of page 0. This prevents subsequent programming of page 0. Thus, sectors 1, 2 and 3 of page 0 are not programmed and remain empty (erased). After page 0 is programmed, sector X+1 is received. Sector X+1 is stored as sector 0 of page 1. Sectors 1, 2 and 3 of page 1 remain empty. After sector X+1 is programmed, sector X+2 is received. Sector X+2 is stored as sector 0 of page 2. Sectors 1, 2 and 3 of page 2 remain empty. After sector X+2 is programmed, sector X+3 is received. Sector X+3 is stored as sector 0 of page 3. Sectors 1, 2 and 3 of page 3 remain empty.

FIG. 9 shows an alternative way of storing sectors in an erase block, designated active block 900. Here, instead of storing just one sector per page, previously stored sectors are copied to a new page in the same erase block where they are stored with a more recently received sector. Sector X is stored as sector 0 of page 0 as before. Then, sector X+1 is received and stored as sector 1 of page 1 with sector X copied from page 0 to sector 0 of page 1. Thus, both sector X and sector X+1 are stored in page 1. Subsequently, sector X+2 is received and stored as sector 2 of page 2. Sector X is stored as sector 0 of page 2 and sector X+1 is stored as sector 1 of page 2. Thus, sectors X, X+1 and X+2 are stored together in page 2. Subsequently, sector X+3 is received and stored as sector 3 of page 3. Sector X is stored as sector 0, sector X+1 is stored as sector 1 and sector X+2 is stored as sector 2 of page 3. Thus, four sectors of data are stored in page 3 so that page 3 is fully populated with data.

Subsequent to the storage of sectors shown in FIGS. 8 or in FIG. 9, data may be consolidated. Sectors X, X+1, X+2 and X+3 of either FIG. 8 or FIG. 9 may be copied to a single page of a new erase block. This may be done as part of garbage collection at a time when it is convenient. FIG. 10A shows sectors X, X+1, X+2 and X+3 stored in page 0 of designated active block 1000. Page 0 of erase block 1000 is filled with data. When page 0 of active block 1100 is programmed with sectors X, X+1, X+2 and X+3, sectors X, X+1, X+2 and X+3 may be erased from the erase block from which they were copied. Active blocks 800, 900 may be erased and made available for storage of new data when their contents are consolidated during garbage collection.

Subsequent to programming of page 0, sector X+4 is received and is stored as sector 0 of page 1 of active block 1000. Then, sectors X+5, X+6 and X+7 are individually received and stored in pages 2, 3 and 4 respectively. Consolidation of sectors may be needed again to consolidate sectors X+4, X+5, X+6 and X+7 to a single page. Such consolidation of sectors takes time during which host data may not be written. After the second consolidation of data to another erase block, erase block 1000 from which they are copied is marked as obsolete and may subsequently be erased.

FIG. 10B shows an active block 1010 after the second garbage collection operation relocates data from the previous active block 1000. Sectors X+4 to X+7 are consolidated into a single page (page 1) of active block 1010. Subsequently, more sectors may be received and may be stored in active block 1010. If such sectors are received in the form of single sectors, a single sector may be stored in a page as before.

FIG. 10C shows active block 1010 with additional sectors X+8 to X+11 stored in pages 2-5. Another garbage collection operation may be needed to consolidate sectors X+8 to X+11 at this point. Thus, in order to efficiently store sectors that are received from a host as single sectors, this method uses multiple garbage collection operations that require transferring data from one erase block to another erase block and erasing the first erase block. In larger erase blocks, the number of garbage collection operations is larger. In memory systems that use metablocks, a group of erase blocks may be linked so that they are erased together and programmed together. Data may be programmed in metapages containing many sectors. Therefore, storing single sectors becomes very inefficient because of the amount of garbage collection necessary.

FIG. 11A shows an alternative method of storing data. FIG. 11A shows two erase blocks of a memory array. Active block 1110 is an erase block in which data may be programmed for long-term storage. Scratch pad block 1120 is an erase block in which data may be programmed for short-term storage. When small numbers of sectors are received, they are first stored in scratch pad block 1120. Sectors continue to be stored in scratch pad block 1120 until enough sectors are received to fill a page of data. These sectors are then copied to a page of active block 1110.

Sector X is received and programmed as sector 0 of page 0 in scratch pad block 1120 as before. Subsequently, sector X+1 is received and stored as sector 1 of page 1 of scratch pad block 1120 with sector X copied to sector 0 of page 1. Subsequently, sector X+2 is received and stored as sector 2 of page 2 of scratch pad block 1120 with sectors X and X+1 stored as sector 0 and sector 1 of page 2 respectively. Subsequent to storing sector X+2 in scratch pad block 1120, sector X+3 is received. At this point, sectors X, X+1, X+2 and X+3 are written to page 0 of active block 1110. These four sectors form a full page of data. Thus, sectors X, X+1, X+2 and X+3 are efficiently stored in page 0 of active block 1110. Subsequently, sectors X+4, X+5, X+6 and X+7 are individually received. Sectors X+4, X+5 and X+6 are stored in pages 3, 4 and 5 of scratch pad block 1120 and are copied to sectors 0, 1 and 2 of page 1 of active block 1110 when sector X+7 is received. Sector X+7 is programmed directly to sector 3 of page 1 of active block 1110. At this point, scratch pad block 1120 has no available pages for storing data and may be designated as being ready for erase (obsolete). A new erase block may be designated as a scratch pad block for the next sector, or group of sectors, to be received. While this example shows single sectors being received, this method may also be used for groups of sectors where the group of sectors has fewer sectors than the number of sectors in a page. Also, while the above examples show writing data from a scratch pad block to an active block with maximum parallelism, such writing may be done with less than maximum parallelism and still provide an efficiency benefit. Thus, sectors are written to the scratch pad block with one degree of parallelism and subsequently written to another block with a higher degree of parallelism so that the data is more densely packed and requires less frequent garbage collection.

A scratch pad block may also be used in memory arrays that use metablocks. For example FIG. 11B shows two metablocks, active block 1130 and scratch pad block 1140. Both active block 1130 and scratch pad block 1140 have four planes, indicated as planes 0-3. Each plane is one sector wide, so four sectors are stored in a metapage of block 1130 or 1140. Both blocks have 6 metapages, indicated as metapage 0-5. The technique for efficiently storing data is the same as that described above with respect to erase blocks. Sectors are accumulated in scratch pad block 1140 until a full metapage of data is available at which time a full metapage is programmed to active block 1130. For example, when sector X+3 is received, a full metapage (sectors X, X+1, X+2 and X+3) is programmed to metapage 0 of active block 1130. A metapage may have a large number of sectors because metablocks may have many planes and planes may be several pages wide. The technique described above is particularly valuable for such large metapages because of the large amount of space in the memory array that would otherwise be wasted. As shown with respect to FIGS. 11A and 11B, aspects of this invention described with respect to examples using erase block architecture may also be applied to metablock architecture and vice versa. The term "block" may indicate either an erase block or a metablock depending on the configuration of the memory array. In either case, a block is the unit of erase used in that configuration. Similarly, the term "page" may refer to either a page within a single erase block or a metapage of a metablock. In either case, a page is the unit of programming for the configuration.

Where a group of sectors is received that has more than the number of sectors in a page, sectors may be programmed directly to the active block of the memory array without first being stored in the scratch pad block. Thus, full pages of data may be programmed directly to the active block with a high degree of parallelism, while partial pages of data are programmed to the scratch pad block with a lower degree of parallelism until they may be written as part of a full-page program to the active block. A controller may determine the destination for a particular sector or group of sectors. Where writing a group of sectors to the active block would include both partial-page and full-page writes, the full-pages may be written to the active block and the partial page may be written to the scratch pad block.

FIG. 12A shows a further example where sectors from a host are updated while they are stored in a scratch pad block. A first sector $X_0$ is received and stored in page 0 of scratch pad block 1250. A page in this example stores four sectors of data. A replacement for $X_0$, shown as $X_1$, is then received. The sectors in this example are numbered according to their logical address, with a subscript to indicate whether the sector is an update and if so, which version. Thus, sector X is a sector with logical address X and is the first updated version of this sector. This is a sector of data that has the same logical address as $X_0$ but may contain different data reflecting some updated information. Sector $X_1$ is written to page 1 of scratch pad block 1250. The controller keeps track of which sectors are current and which are obsolete. In scratch pad block 1250, the most recently written copy of a sector with a particular logical address is the current version. Any other version is obsolete. Thus $X_0$ becomes obsolete when $X_1$ is programmed. Subsequent to receiving sector $X_1$, sector $(X+1)_0$ is received. This is a sector that is logically sequential to sector $X_1$. Both sectors $X_1$ and $(X+1)_0$ are written to page 2. Subsequently, sector $(X+1)_0$ is replaced by $(X+1)_1$. This is an updated version of sector $(X+1)_0$ that replaces sector $(X+1)_0$. Sector $(X+1)_1$ is written to page 3 along with sector $X_1$. Subsequently, sector $(X+2)_0$ is received and written to page 4. Sector $(X+2)_0$ is subsequently replaced by sector $(X+2)_1$ and written to page 5 along with sectors $X_1$ and $(X+1)_1$. Subsequently, sector $(X+3)_0$ is received. Thus, a page of data (sectors $X_1$, $(X+1)_1$, $(X+2)_1$ and $(X+3)_0$) are available. Sectors $X_1$, $(X+1)_1$, $(X+2)_1$ and $(X+3)_0$ are written to a block designated as active block 1252. Sectors $X_1$, $(X+1)_1$, $(X+2)_1$ and $(X+3)_0$ are written to active block 1252 with parallelism of a full page write. This is the maximum possible parallelism in this case. Thus, even though sectors $X_1$, $(X+1)_1$, $(X+2)_1$ and $(X+3)_0$ were written to the scratch pad block 1250 with a low degree of parallelism, they are subsequently written to active block 1252 with a high degree of parallelism. This means that sectors $X_1$, $(X+1)_1$, $(X+2)_1$ and $(X+3)_0$ are more efficiently stored in the active block. More efficient storage may result in garbage collection being necessary less frequently, thus improving performance.

An alternative example is provided in FIG. 12B. This example is similar to that shown in FIG. 12A but here sector $(X+3)_0$ is stored in scratch pad block 1250 prior to being copied to active block 1252. This allows sector $(X+3)_0$ to be updated before it is written to active block 1252. Sector $(X+3)_0$ is shown being updated by being replaced by sector $(X+3)_1$. The complete page of data (sectors $X_1$, $(X+1)_1$, $(X+2)_1$, and $(X+3)_1$) may be held in scratch pad block 1250, ready to be updated, until some triggering event. In this case, sector $(X+4)_0$ is received, providing a triggering event. Sectors $X_1$, $(X+1)_1$, $(X+2)_1$, and $(X+3)_1$ are written to active block 1252 at this point with maximum parallelism. Sector $(X+4)_0$ is written to the next available page (page 8) in scratch pad block 1250.

FIG. 12C shows another example of updating data using scratch pad block 1250. Sectors of data $X_0$ to $(X+15)_0$ are stored in an original block 1254. A host sends sector $(X+6)_1$, which is an updated sector with the same logical address as sector $(X+6)_0$. Thus, sector $(X+6)_1$ is to replace $(X+6)_0$. In order to replace sector $(X+6)_0$, page 1 of original block 1254 (containing sectors $(X+4)_0$ to $(X+7)_0$) is combined with sector $(X+6)_1$ and the combination is written to page 0 of scratch pad block 1250. Combining these sectors may take place in a Random Access Memory such as controller ram 25 or may be done in memory registers that are connected to the memory array. The updated page data may be kept in scratch pad block 1250 without writing it to an active block for some time. Where a subsequent updated sector $(X+5)_1$ is received from a host, the data may be updated in scratch pad block 1250 by writing sector $(X+5)_1$ along with copied sectors $(X+4)_0$, $(X+6)_1$, and $(X+7)_0$ to another page of scratch pad block 1250 (in this case, page 1). Multiple updates of a page of data in scratch pad block 1250 may be performed in this way. An update is carried out by replacing the updated sector or sectors of data and copying of unchanged sectors of data in a new page of scratch pad block 1250. The copied sectors are copied within the same plane so that copying may be efficiently performed. Subsequently, the updated page of data may be copied to active block 1252 in the memory array. Non-sequential updates may be performed in this way without requiring a chaotic update block. For example, updated sectors $(X+6)_1$ and $(X+5)_1$ are received non-sequentially in the above example, but active block 1252 is sequential. Multiple pages of data may be held and updated at the same time in a scratch pad block in this way. A page may be copied to an active block when the page is no longer expected to be updated.

Example of Multi-level Cell Programming

Certain kinds of memories may store more than one bit of data in each cell of the memory array by dividing the threshold voltage range of a floating gate memory cell into more than two levels. FIG. 13 shows an example of how such multi-level cell (MLC) memories may be programmed to provide multiple threshold voltages that signify different logical states. Four different threshold voltages are shown, labeled A, B, C and D. Multiple cells are programmed to each voltage. FIG. 13 represents the distribution of cell states With the number of cells represented on the vertical axis. Each threshold voltage A, B, C and D represents a different logical state. The four states represent two bits of data, one bit from a lower page of data and one bit from an upper page of data as indicated. In some examples, the lower page may be programmed first. After programming of the lower page, the cell is in state A or B. Subsequently, the upper page may be programmed so that the cell either stays in states A or B (for upper bit=1) or is modified to states C or D (for upper bit=0). Because these four states each have relatively narrow voltage windows, MLC memories are particularly vulnerable to corruption of data from relatively small changes in threshold voltages. In some examples, it may be advantageous to program both lower and upper pages simultaneously. This may help to reduce corruption of data in a cell caused by programming of adjacent cells, such as may occur during programming of upper page data.

FIG. 14 shows an example of how a scratch pad block 1460 may be used to reduce corruption of data in MLC memories. FIG. 14 shows both active block 1462 and scratch pad block 1460 as blocks of MLC memory. Pages of both blocks are numbered and shown as either "upper" or "lower" depending on which threshold voltage states are used to store the bits of data of the page. In this example, the memory first receives sectors X to X+3 and stores these sectors in lower page 0 of scratch pad block 1460. Subsequently, the memory receives sectors X+4 to X+7. At this time, both the lower page (sectors X to X+3) and the upper page (X+4 to X+7) are written simultaneously to active block 1462. This may avoid corruption of lower page 0 of active block 1462 during programming of upper page 0 of active block 1462. Typically, the time necessary to program the upper and lower pages together is the same as the time necessary to program the upper page alone so that this system does not carry a time penalty. Subsequent to programming of lower page 0 and upper page.0 of active block 1462 with sectors X to X+7, sectors X+8 to X+11 are received and are programmed to upper page 0 of scratch pad block 1460. When sectors X+12 to X+15 are received, sectors X+8 to X+11 and sectors X+12 to X+15 are programmed in parallel to upper page 1 and lower page 1 of the active block. This system is continued for subsequent sectors of data as shown. Thus, a page of data is written to scratch pad block 1460 and subsequently this page is written together with an additional page to active block 1462 as upper and lower pages of the same group of memory cells. Programming to scratch pad block 1460 occurs with the parallelism of a page, while programming to active block 1462 takes place with double the parallelism of a page.

In an alternative embodiment, the upper and lower pages may be written to an active block at different times but a copy of the lower page is kept in a scratch pad block in case the lower page in the active block becomes corrupted during programming of the upper page. In FIG. 14, sectors X to X+3 may be received and programmed to both the lower page 0 of active block 1462 and to lower page 0 of scratch pad block 1460 at the same time. Subsequently, sectors X+4 to X+7 are received and are programmed to upper page 0 of active block 1462. Sectors X+4 to X+7 are not saved in scratch pad block 1460. If there is any problem during the programming of X+4 to X+7 to upper page 0 of active block 1462 (such as loss of power), the data in lower page 0 of active block 1462 could be corrupted. That is, the threshold voltage of the cells being programmed could be modified so that they are no longer in a state representing data of the lower page but have not been fully programmed to a state representing data of the upper page. For example, a cell that is being programmed from state A in FIG. 13 to state D could be in state B or C at a time when programming stops. If data is corrupted in this manner the upper page of data that is being written may be recovered from the location from which it is being copied. However, in many cases, no other copy of the lower page exists. Here, a copy of the lower page is kept in scratch pad block 1460 until the programming of the upper page is completed. Thus, an uncorrupted copy of the lower page exists and may be used to recover the data of the lower page.

Examples of Multiple Files

Data from more than one host data file may be stored in a single block. The break between files may occur within a page so that part of a page contains data from one file and part of a page contains data from another file. FIG. 15 shows an example where page 0 to page i−1 of original block 1570 contain data from a first file (file 1) and page i+1 to page n−1 contain data from a second file (file 2). Page i contains sectors (i*4) and (i*4)+1 from file 1 and sectors (i*4)+2 and (i*4)+3 from file 2. The sectors of file 2 are shaded to illustrate that sectors from two files are present.

FIG. 15 shows file 2 being updated to a new block 1572. The first page (page 0) of new block 1572 is written with the contents of page i of original block 1570. Thus, page 0 of new block 1572 contains sectors from both file 2 and file 1. Sectors (i*4) and (i*4)+1 from file 1 are not updated at this point but may be copied in order to program a full page of data. The remainder of updated file 2 is programmed to pages 1 to i−1 of new block 1572. Subsequently, file 1 is updated. Sector 0 to sector (i*4)−1 are stored in page i to page n−1. However, sectors (i*4) and (i*4)+1 are also part of file 1 and must be updated. Because new block 1572 is full at this point, the updated sectors (i*4) and (i*4)+1 are programmed to another block. Subsequently, sectors (i*4) and (i*4)+1 and the sectors in new block 1572 may be consolidated to a single block as part of a garbage collection operation. However, this takes time and system resources and is generally undesirable.

FIG. 16 shows an alternative technique for updating sectors of original block 1570 of FIG. 15 that contains sectors from two different files. This technique uses a scratch pad block 1674 to store updated sectors until such time as they may be written as part of a full updated page with the maximum parallelism of the system. When file 2 is updated, updated sectors (i*4)+2 and (i*4)+3 are written to scratch pad block 1674. Here, they are written to page 0 of scratch pad block 1674 and no data is written to the rest of the page so that a low degree of parallelism is used. The remaining sectors of file 2 (sectors (i*4)+4 to N−1) are copied to pages 0 to n−i of a new block 1676. These sectors are all written in full-page writes using the maximum parallelism. Subsequently, file 1 is updated. Sectors 0 to (i*4)−1 are programmed with maximum parallelism into pages n−i+1 to n−2. Sectors (i*4) and (i*4)+1 of file 1 are then written in parallel with copying of sectors (i*4)+2 and (i*4)+3 to page n−1 of new block 1676. Thus, an updated copy of all the sectors that were previously held in original block 1570 are now held in new block 1676 and no obsolete data is held in new block 1676. There is generally no need to garbage collect a block such as new block 1676. Each page of new block 1676 is programmed with maximum parallelism to achieve maximum density of data in the block. Sectors (i*4)+2 and (i*4)+3 in scratch pad block 1674 may be marked as obsolete at this point. However, scratch pad block 1674 may be used for further operations without requiring a garbage collection operation because the scratch pad block routinely contains both current and obsolete data.

Example of Storing Non-sequential Sectors of Data

In some of the previous examples, sectors of data are written to the scratch pad block with a degree of parallelism that is less than that of writing a complete page. In such examples, the remaining space in the page of the scratch pad block that is being written may remain empty because it is not possible to program it later without disturbing already-stored data. In some cases, it is possible to use this otherwise empty space and otherwise unused programming bandwidth to store unrelated data in the same page. For example, where a memory system receives host data in single sectors or groups of sectors less than a page, these sectors of host data may be stored in the scratch pad block in pages that also hold unrelated data such as unrelated host data or sectors of control data. Similarly, sectors from the beginning of a file that are being stored in a scratch pad block for later storage as part of a full page may have additional sectors stored in the same scratch pad block page that are not logically related.

FIG. 17 shows an example where sectors X, X+1 and X+2 are stored in a scratch pad block 1780 as in previous examples. However, here the remaining space in the pages of the scratch pad block holding sectors X, X+1 and X+2 are used to store other data. Sectors Y, Y+1 and Y+2 are stored with sector X in page 0. Sectors Y, Y+1 and Y+2 may be logically unrelated to sectors X, X+1 and X+2. They may be from another host data file or from another cluster of sectors within the same file. Sectors Y, Y+1 and Y+2 may be non-sequential with sectors X, X+1 and X+2 and may be separated in logical address space. Similarly, sectors Z and Z+1 are stored in page 1 with sectors X and X+1. Sectors Z and Z+1 may be logically unrelated to both sectors X, X+1 and X+2 and sectors Y, Y+1 and Y+2. Sectors X, X+1, X+2 and X+3 are subsequently written to a page of another block when sector X+3 is received. Sectors Y, Y+1, Y+2 and Y+3 are written to a page of another block when sector Y+3 is received. Thus, unrelated data may be stored in the same page of the scratch pad block to more efficiently use the available resources.

FIG. 18 shows another example of unrelated data stored in a scratch pad block 1890. Here, sectors X, X+1 and X+2 are stored and updated as before. However, here sector Y is also stored and updated in parallel. Updated sectors are denoted by a subscript indicating what version is stored. For example, sector $X_0$ is the original version of sector X, while $X_1$ is the first updated version of sector X. Sector Y may be a sector of host data or a sector of control data that is frequently updated. In some systems, control data such as FAT information is updated as host data is stored. Where small amounts of host data are received it may be advantageous to update the control data in scratch pad block 1890. This may avoid updating a control structure where only a single sector of control data is updated. At some later time, the control data structures may be updated using control data from the scratch pad block.

Scratch Pad Block Management

A scratch pad block may be a designated block in the memory array. A fixed physical location may be chosen as the scratch pad block. However, this may result in uneven wear of the memory array. Alternatively, the designated block may be changed from time to time so that as the scratch pad block becomes filled with obsolete data, another erase block is chosen as the scratch pad block. In this case, data structures used by the memory controller may identify the location of the scratch pad block or the designated scratch pad block may be marked so that if the controller scans the erase blocks of the memory array it may determine which erase block is the scratch pad block. A scratch pad block may be marked using a sector to identify it as a scratch pad block. For example, FIG. 19 shows marking sector 2110 as the first sector of scratch pad block 2100. When the card is powered on, the erase blocks of the memory array (or a portion of the memory array) may be scanned to determine the location of a scratch pad block or scratch pad blocks. In the example of FIG. 19, the first sector of each erase block is read to see if it is a marking sector indicating a scratch pad block.

Data may be written to a scratch pad block as a data group. A data group is a logically sequential group of sectors received from a host. When a data group is stored in the scratch pad block, an index sector is also written that provides information about the data group stored. The locations of the sectors of the data group may be stored in an index sector. A scratch pad block such as scratch pad block 2100 of FIG. 19 may be used to store multiple data groups. FIG. 20 shows scratch pad 2100 storing one data group. Data group 1 consists of two sectors 2220, 2221. These sectors, marking sector 2110 and an index sector 2230 are stored in scratch pad 2100. Index sector 2230 stores information about group 1.

FIG. 21 shows scratch pad block 2100 of FIG. 20 after data group 2 consisting of two sectors 2340, 2341 is programmed. Index sector 2350 is a new index sector that stores information about group 1 and group 2. Thus, index sector 2230 is obsolete because index sector 2350 contains a complete record of the data groups of scratch pad block 2100 including group 1.

FIG. 22 shows scratch pad block 2100 of FIG. 21 after programming of data group 3 consisting of sectors 2460, 2461 and 2462. Index sector 2470 is a new index sector that stores information about data groups 1, 2 and 3. Index sector 2470 contains a complete record of the data of scratch pad block 2100 and thus makes index sector 2350 obsolete.

FIG. 23 shows scratch pad block 2100 of FIG. 22 after data group 1 and data group 2 are read from scratch pad block 2100 and are written as a single page in another block of the memory array. Index sector 2560 stores information about data group 3. Data group 1 and data group 2 in scratch pad 2100 are obsolete and do not require indexing because they are stored elsewhere. Thus, index sector 2560 contains a complete record of all current data in scratch pad block 2100.

When a host requests a sector or sectors of data from the memory array, a controller may first check if the requested sectors are in the scratch pad block. If the sectors are not present in the scratch pad block, the sectors may be sought in the regular manner. Thus, the scratch pad does not require changes to the regular media management used to keep track of the locations of sectors of data in the memory array.

Although the invention has been described with respect to various exemplary embodiments, it will be understood that the invention is entitled to protection within the full scope of the appended claims.

It is claimed:

1. A method of storing addressable units of data in a non-volatile memory array having a minimum unit of erase of a block and a minimum unit of program of a page, a page containing one or more addressable units of data, a page containing less data than a block, comprising:
    writing a plurality of addressable units of data in a first block with a first degree of parallelism;
    subsequently copying the plurality of addressable units of data to a second block where they are written in a write operation having a second degree of parallelism that is higher than the first degree of parallelism; and
    subsequently writing additional addressable units of data to the first block while the first block contains the plurality of addressable units of data.

2. The method of claim 1 wherein the first degree of parallelism is less than the parallelism of programming a full page of data and the second degree of parallelism is the degree of parallelism of programming a full page of data.

3. The method of claim 1 wherein the plurality of addressable units of data form a portion of a first file, the portion containing less than one page of data, subsequent copying of the plurality of addressable units of data is in parallel with programming of a portion of a second file, such that the portion of the first file and the portion of the second file form a page of data in the second block.

4. The method of claim 1 wherein the second block contains a plurality of multi-level cells, the plurality of addressable units of data form a first page in the first block and are copied to the second block in parallel with writing a second page of data to the second block such that the first page and the second page form upper and lower pages of programming of the plurality of multi-level cells.

5. The method of claim 1 wherein the plurality of addressable units of data are written to the second block in parallel with additional data to achieve the second degree of parallelism.

6. A method of writing addressable units of data to multi-level cells in a non-volatile memory array, the memory array having a unit of erase of a block, a multi-level cell having more than two possible programmed states corresponding to more than one bit of data, comprising:
    receiving a first addressable unit of data and a second addressable unit of data from a host;
    programming the first addressable unit of data to both a first block and to a plurality of multi-level cells of a second block;
    programming the plurality of multi-level cells of the second block according to bits of the second unit of data while the first addressable unit of data is held in the first block without programming the second addressable unit of data to the first block; and
    subsequently marking the first addressable unit of data in the first block as obsolete only after verifying that the plurality of multi-level cells of the second block are fully programmed to states that reflect bits of the second unit of data.

7. The method of claim 6 wherein programming the plurality of multi-level cells of the second block according to bits of a second addressable unit terminates at an intermediate stage where a cell has not reached a state that reflects a bit of the second unit of data but the cell has been modified from a state that reflects a bit of the first unit of data and subsequently recovering the bits of the first unit of data from the first block.

8. The method of claim 6 wherein the first addressable unit of data is programmed to the first block at a first time, the first and second addressable units of data are subsequently programmed to the second block at a second time when the second addressable unit of data is received.

9. The method of claim 6 further comprising erasing the first block when all data in the first block is marked as obsolete.

10. A method of storing logically non-sequential addressable units of data in a non-volatile memory array having minimum units of erase of a block and minimum units of programming of a page, comprising:
    storing a first at least one addressable unit of data in a first page of a first block;
    storing a second at least one addressable unit of data in parallel with the first at least one addressable unit of data in the first page of the first block, the second at least one addressable unit of data not logically sequential with the first at least one addressable unit of data;
    subsequently copying the first at least one addressable unit of data to a second block and copying the second at least one addressable unit of data to a third block; and
    subsequently storing a third at least one addressable unit of data in the first block while the first block holds the first at least one addressable unit of data and the second at least one addressable unit of data.

11. The method of claim 10 wherein the first at least one addressable unit of data comprises host data and the second at least one addressable unit of data comprises control data.

12. The method of claim 10 wherein the first at least one addressable unit of data comprises a plurality of logically sequential addressable units of host data of a first file and the second at least one addressable unit of data comprises a plurality of logically sequential addressable units of host data of a second file.

13. The method of claim 10 wherein the third at least one addressable unit of data is stored in a second page of the first block, the third at least one addressable unit of data being logically non-sequential with both the first and second at least one addressable units of data.

14. The method of claim 13 wherein the first at least one unit of data contains data from a first file, the second at least one unit of data contains data from a second file and the third at least one unit of data contains data from a third file.

15. A method of storing data in a non-volatile memory array having memory cells arranged in minimum units of erase of an erase block, groups of erase blocks linked to form metablocks, a metapage being the unit of programming of a metablock, comprising:
storing a first sector of data in a first metapage of a first metablock;
storing at least a second sector in at least a second metapage of the first metablock;
writing the first sector of data, the at least a second sector of data and a third sector of data together to a metapage of a second metablock when the third sector of data is received; and
subsequently storing a fourth sector of data in the first metablock without erasing the first sector of data and the at least a second sector of data from the first metablock.

16. The method of claim 15 wherein the first sector of data, the at least a second sector of data and the third sector of data combined form a full metapage of data.

17. The method of claim 15 wherein subsequent to writing the first sector of data, the at least a second sector of data and the third sector of data together to a metapage of the second metablock, the first metablock is not immediately marked as obsolete.

18. The method of claim 15 wherein the first sector of data is copied from the first metapage to the at least a second metapage.

19. The method of claim 15 wherein the at least a second sector consists of a second sector and an additional sector, the first and second sectors being stored in the second metapage of the first metablock, the first, second and additional sectors being stored in a third metapage of the first metablock.

20. The method of claim 15 wherein the first sector of data, the at least a second sector of data and the third sector of data form a metapage of the second metablock.

21. A method of storing data in a non-volatile memory array having memory cells arranged in minimum units of erase of an erase block, a page being the minimum unit of programming of an erase block, comprising:
storing a first sector of data in a first page of a first erase block;
storing at least one additional sector in at least one additional page of the first erase block;
writing the first sector of data, the at least one additional sector of data and a final sector of data together to a page of a second erase block when the final sector of data is received; and
subsequently storing a second sector of data in the first erase block without erasing the first sector of data and the at least one additional sector from the first erase block.

22. The method of claim 21 wherein the first sector of data, the at least one additional sector of data and the final sector of data together completely fill the page of the second erase block.

* * * * *